United States Patent
Jung et al.

(10) Patent No.: US 10,548,178 B2
(45) Date of Patent: Jan. 28, 2020

(54) METHOD AND DEVICE FOR ESTABLISHING COMMUNICATION CONNECTION

(71) Applicant: Samsung Electronics Co., Ltd., Gyeonggi-do (KR)

(72) Inventors: Bu-Seop Jung, Gyeonggi-do (KR); Soonho Lee, Seoul (KR); Namju Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 15/399,615

(22) Filed: Jan. 5, 2017

(65) Prior Publication Data

US 2017/0196034 A1    Jul. 6, 2017

(30) Foreign Application Priority Data

Jan. 5, 2016    (KR) .................. 10-2016-0000932

(51) Int. Cl.
*H04W 76/23* (2018.01)
*H04W 76/15* (2018.01)
*H04W 76/14* (2018.01)
*H04W 28/02* (2009.01)

(52) U.S. Cl.
CPC ....... *H04W 76/23* (2018.02); *H04W 28/0231* (2013.01); *H04W 76/14* (2018.02); *H04W 76/15* (2018.02)

(58) Field of Classification Search
CPC ..... H04W 76/10; H04W 76/14; H04W 76/15; H04W 28/0252; H04W 28/0257; H04W 28/0263; H04W 28/0231; H04W 72/12; H04W 72/1226; H04W 72/1205; H04W 72/121; H04W 72/1294; H04W 72/14; H04W 36/03

See application file for complete search history.

(56) References Cited

U.S. PATENT DOCUMENTS

| 2014/0355527 | A1* | 12/2014 | Vaidya ................. H04W 76/15 370/329 |
| 2014/0379883 | A1 | 12/2014 | Filgueiras et al. |
| 2014/0379884 | A1 | 12/2014 | Filgueiras et al. |

(Continued)

OTHER PUBLICATIONS

"802.11n, Part 11: Wireless LAN Medium Access Control (MAC) and Physical Layer (PHY) Specifications, Amendment 5: Enhancements for Higher Throughput", IEEE, 2009, 536 pages.

*Primary Examiner* — Ashley Shivers

(57) ABSTRACT

An electronic device includes a communication module configured to support a plurality of communication channels that include a first communication channel and a second communication channel, and a processor operatively coupled with the communication module. The processor is configured to use the first communication channel to establish a first communication connection between the electronic device and another electronic device, while the first communication connection has been established, to check a second communication connection between the electronic device and a first access point using the second communication channel, and based on the checking, to change a channel for the first communication connection from the first communication channel to the second communication channel.

20 Claims, 21 Drawing Sheets

(56) References Cited

U.S. PATENT DOCUMENTS

| | | |
|---|---|---|
| 2015/0049681 A1 | 2/2015 | Huang et al. |
| 2015/0103680 A1 | 4/2015 | Anand et al. |
| 2015/0103730 A1* | 4/2015 | Emmanuel ........ H04W 28/0215 370/315 |
| 2017/0105222 A1* | 4/2017 | Nieman ................ H04W 76/14 |
| 2017/0111854 A1* | 4/2017 | Ho ........................... H04B 7/14 |

* cited by examiner

METHOD AND DEVICE FOR ESTABLISHING COMMUNICATION CONNECTION

CROSS-REFERENCE TO RELATED APPLICATION AND CLAIM OF PRIORITY

The present application is related to and claims the priority under 35 U.S.C. § 119(a) to Korean Application Serial No. 10-2016-0000932, which was filed in the Korean Intellectual Property Office on Jan. 5, 2016, the entire content of which is hereby incorporated by reference.

TECHNICAL FIELD

Various exemplary embodiments relate to a method for performing communication connection and, for example, relate to a method and device for establishing a communication connection by using a first communication channel or a second communication channel among a plurality of communication channels.

BACKGROUND

With the recent growth of digital technologies, various types of electronic devices such as mobile communication terminals, Personal Digital Assistants (PDAs), electronic organizers, smart phones, tablet Personal Computers (PCs), wearable devices, etc. are being used widely. These electronic devices came to have various functions such as functions of message transmission such as a voice call, a Short Message Service (SMS)/Multimedia Message Service (MMS), etc., a video call, an electronic organizer, photographing, e-mail transmission/reception, broadcast play, the Internet, music play, a schedule management, a Social Networking Service (SNS), a messenger, a dictionary, a game, etc.

Wireless-Fidelity Peer To Peer (Wi-Fi P2P) or Wi-Fi direct can use an existing Wi-Fi interface to directly provide a connection to a network even without an Access Point (AP) that is a medium of an existing infrastructure network between Wi-Fi electronic devices. Connecting between the Wi-Fi electronic devices using the Wi-Fi P2P is called a 'P2P Group'. For example, in case where the Wi-Fi electronic devices are connected on a point-to-point basis, one electronic device can operate as an 'owner device' of the P2P group, and the other electronic device can operate as a 'client device' of the P2P group. The owner device can perform an Internet connection function of an access point of a Wireless Local Area Network (WLAN) network. Also, the client device can play a role of a station of the WLAN network. In a state in which the owner device is P2P connected with the client device, the owner device can be connected with the access point.

The owner device of the 'P2P group' can time divide and use a communication channel communicating with the client device and a communication channel communicating with the access point, because the communication channel communicating with the client device and the communication channel communicating with the access point are different from each other. For example, the owner device switches a communication channel to the communication channel communicating with the client device or the communication channel communicating with the access point in accordance with time. This communication channel switching of the owner device can lead to a deterioration of the communication performance of the owner device.

SUMMARY

To address the above-discussed deficiencies, it is a primary object to provide a method and device capable of, in a case of being communication connected with an access point in course of a communication connection with another electronic device, changing and making identical a communication channel communicating with the other electronic device and a communication channel communicating with the access point, thereby enhancing communication performance.

An electronic device according to various exemplary embodiments can include a communication module supporting a plurality of communication channels that include a first communication channel and a second communication channel, and a processor operatively coupled with the communication module. The processor can be set to use the first communication channel to establish a first communication connection between the electronic device and another electronic device, while the first communication connection has been established, check a second communication connection between the electronic device and a first access point using the second communication channel, and based on the checking, change a channel for the first communication connection from the first communication channel to the second communication channel.

An electronic device according to various exemplary embodiments can include a communication module supporting a plurality of communication channels that include a first communication channel and a second communication channel, and a processor operatively coupled with the communication module. The processor can be set to use the first communication channel to establish a first communication connection between the electronic device and another electronic device, while the first communication connection has been established, check a second communication connection between the electronic device and a first access point using the second communication channel, and based on the checking, transmit information on the second communication connection to the other electronic device, and receive a signal for changing the first communication channel into the second communication channel from the other electronic device, and change the first communication channel into the second communication channel.

A method for operating in an electronic device including a communication module and a processor according to various exemplary embodiments is provided. The operation method can include using a first communication channel to establish a first communication connection between the electronic device and another electronic device through the communication module, while the first communication connection has been established, checking a second communication connection between the electronic device and a first access point using the second communication channel, and based on the checking, changing a channel for the first communication connection from the first communication channel to the second communication channel through the processor.

A method for operating in an electronic device including a communication module and a processor according to various exemplary embodiments is provided. The operation method can include using a first communication channel to establish a first communication connection between the electronic device and another electronic device through the communication module, while the first communication connection has been established, checking a second communication connection between the electronic device and a first access point using the second communication channel, and based on the checking, transmitting information on the second communication connection to the other electronic device, and through the processor, receiving a signal for changing the first communication channel into the second communication channel from the other electronic device, and changing the first communication channel into the second communication channel.

According to various exemplary embodiments, in a case of being communication connected with an access point in course of a communication connection with another electronic device, a communication channel communicating with the other electronic device and a communication channel communicating with the access point are changed and made identical with each other, thereby being capable of enhancing communication performance.

According to various exemplary embodiments, in a case of receiving communication connection information from another electronic device, a communication channel communicating with the other electronic device or a communication channel communicating with an access point is changed based on the communication connection information, thereby being capable of preventing P2P performance deterioration, and improving a communication connection stability.

According to various exemplary embodiments, in case where another electronic device is connected with an access point 2, a communication channel communicating with the other electronic device is changed based on AP1 connection information on a communication connected access point 1 and AP2 connection information on the access point 2, thereby being capable of improving usability.

According to various exemplary embodiments, an access point can be changed based on AP1 connection information on a communication connected access point 1 and received AP2 connection information on an access point 2.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
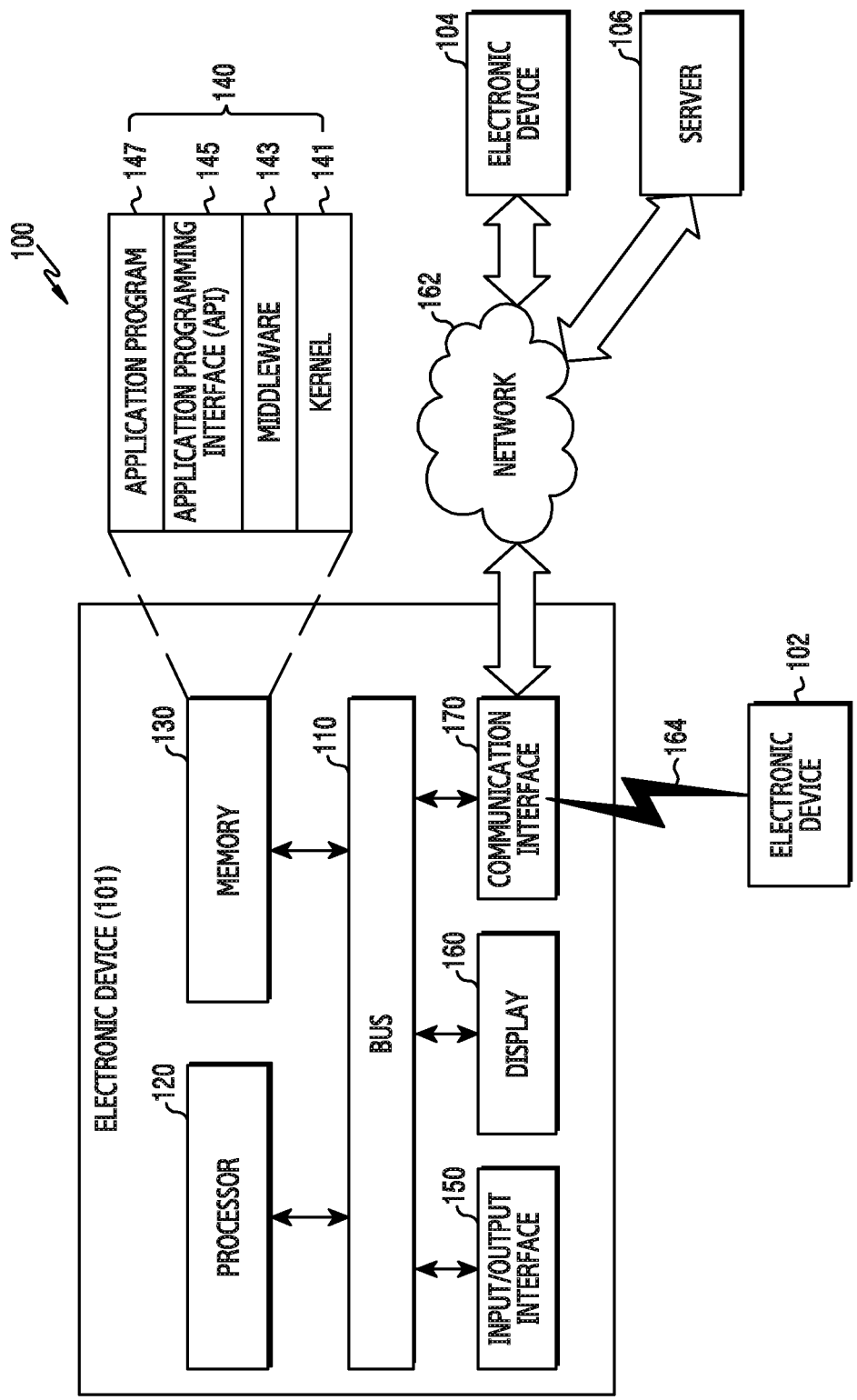
FIG. 1 is a diagram illustrating an electronic device within a network environment according to various exemplary embodiments.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B," "at least one of A and B," or "at least one of A or B" refers to all of (1) including at least one A, (2) including at least one B, or (3) including all of at least one A and at least one B. The expression "a first," "a second," "the first" or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

An electronic device 101 within a network environment 100, according to various embodiments, will be described with reference to FIG. 1. The electronic device 101 can include a bus 110, a processor 120, a memory 130, an input/output interface 150, a display 160, and a communication interface 170. According to an embodiment of the present disclosure, the electronic device 101 can omit at least one of the above components or can further include other components.

The bus 110 can include, for example, a circuit which interconnects the components 110 to 170 and delivers a communication (e.g., a control message and/or data) between the components 110 to 170.

The processor 120 can include one or more of a Central Processing Unit (CPU), an Application Processor (AP), and a Communication Processor (CP). The processor 120 can carry out, for example, calculation or data processing relating to control and/or communication of at least one other component of the electronic device 101.

The memory 130 can include a volatile memory and/or a non-volatile memory. The memory 130 can store, for example, commands or data relevant to at least one other component of the electronic device 101. According to an embodiment of the present disclosure, the memory 130 can store software and/or a program 140. The program 140 can include, for example, a kernel 141, middleware 143, an Application Programming Interface (API) 145, and/or application programs (or "applications") 147. At least some of the kernel 141, the middleware 143, and the API 145 can be referred to as an Operating System (OS).

The kernel 141 can control or manage system resources (e.g., the bus 110, the processor 120, or the memory 130) used for performing an operation or function implemented in the other programs (e.g., the middleware 143, the API 145, or the application programs 147). Furthermore, the kernel 141 can provide an interface through which the middleware 143, the API 145, or the application programs 147 can access the individual components of the electronic device 101 to control or manage the system resources.

The middleware 143, for example, can serve as an intermediary for allowing the API 145 or the application programs 147 to communicate with the kernel 141 to exchange data.

Also, the middleware 143 can process one or more task requests received from the application programs 147 according to priorities thereof. For example, the middleware 143 can assign priorities for using the system resources (e.g., the bus 110, the processor 120, the memory 130, or the like) of the electronic device 101, to at least one of the application programs 147. For example, the middleware 143 can perform scheduling or loading balancing on the one or more task requests by processing the one or more task requests according to the priorities assigned thereto.

The API 145 is an interface through which the applications 147 control functions provided from the kernel 141 or the middleware 143, and can include, for example, at least one interface or function (e.g., instruction) for file control, window control, image processing, character control, and the like.

The input/output interface 150, for example, can function as an interface that can transfer commands or data input from a user or another external device to the other element(s) of the electronic device 101. Furthermore, the input/output interface 150 can output the commands or data received from the other element(s) of the electronic device 101 to the user or another external device.

Examples of the display 160 can include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 can display, for example, various types of contents (e.g., text, images, videos, icons, or symbols) to users. The display 160 can include a touch screen, and can receive, for example, a touch, gesture, proximity, or hovering input using an electronic pen or a user's body part.

The communication interface 170 can establish communication, for example, between the electronic device 101 and an external device (e.g., a first external electronic device 102, a second external electronic device 104, or a server 106). For example, the communication interface 170 can be connected to a network 162 through wireless or wired communication, and can communicate with an external device (e.g., the second external electronic device 104 or the server 106). The wireless communication can use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication can include, for example, short range communication 164. The short-range communication 164 can include at least one of, for example, Wi-Fi, Bluetooth, Near Field Communication (NFC), and Global Navigation Satellite System (GNSS). GNSS can include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" can be interchangeably used with the "GNSS". The wired communication can include, for example, at least one of a Universal Serial Bus (USB), a High Definition Multimedia Interface (HDMI), Recommended Standard 232 (RS-232), and a Plain Old Telephone Service (POTS). The network 162 can include at least one of a telecommunication network such as a computer network (e.g., a LAN or a WAN), the Internet, and a telephone network.

Each of the first and second external electronic devices 102 and 104 can be of a type identical to or different from that of the electronic device 101. According to an embodiment of the present disclosure, the server 106 can include a group of one or more servers. According to various embodiments of the present disclosure, all or some of the operations performed in the electronic device 101 can be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 can request another device (e.g., the electronic device 102 or 104 or the server 106) to execute at least some functions relating thereto instead of or in addition to autonomously performing the functions or services. Another electronic device (e.g., the electronic device 102 or 104, or the server 106) can execute the requested functions or the additional functions, and can deliver a result of the execution to the electronic device 101. The electronic device 101 can process the received result as it is or additionally, and can provide the requested functions or services. To this end, for example, cloud computing, distributed computing, or client-server computing technologies can be used.

Figure 2:
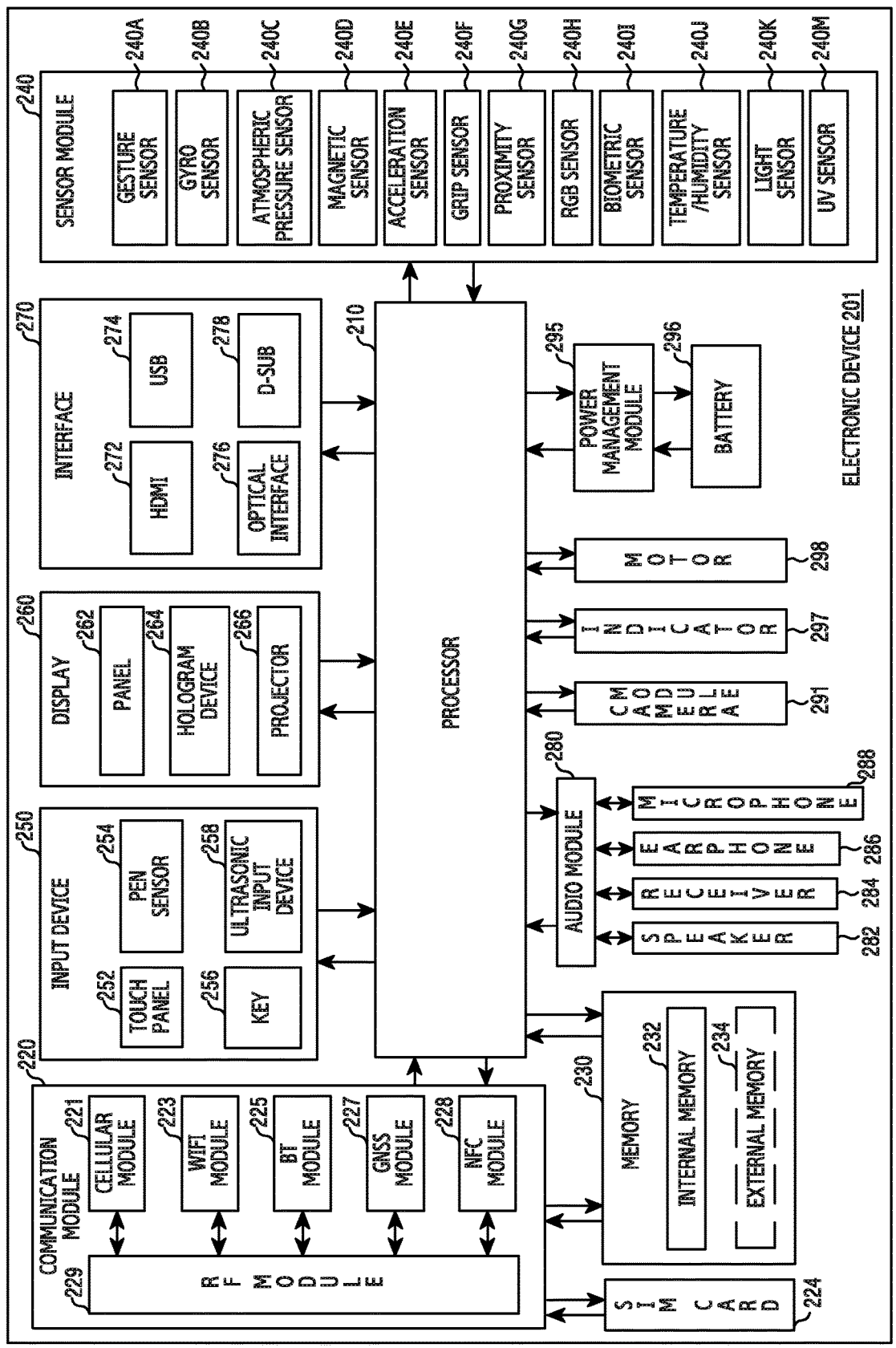
FIG. 2 is a block diagram illustrating a construction of an electronic device according to various exemplary embodiments.

FIG. 2 is a block diagram of an electronic device according to various embodiments of the present disclosure.

The electronic device 201 can include, for example, all or a part of the electronic device 101 shown in FIG. 1. The electronic device 201 can include one or more processors 210 (e.g., Application Processors (AP)), a communication module 220, a memory 230, a sensor module 240, an input device 250, a display 260, an interface 270, an audio module 280, a camera module 291, a power management module 295, a battery 296, an indicator 297, and a motor 298.

The processor 210 can control a plurality of hardware or software components connected to the processor 210 by driving an operating system or an application program, and perform processing of various pieces of data and calculations. The processor 210 can be embodied as, for example, a System on Chip (SoC). According to an embodiment of the present disclosure, the processor 210 can further include a Graphic Processing Unit (GPU) and/or an image signal processor. The processor 210 can include at least some (e.g., a cellular module 221) of the components illustrated in FIG. 2. The processor 210 can load, into a volatile memory, commands or data received from at least one (e.g., a non-volatile memory) of the other components and can process the loaded commands or data, and can store various data in a non-volatile memory.

The communication module 220 can have a configuration equal or similar to that of the communication interface 170 of FIG. 1. The communication module 220 can include, for example, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, can provide a voice call, a video call, a text message service, or an Internet service through a communication network. According to an embodiment of the present disclosure, the cellular module 221 can distinguish and authenticate the electronic device 201 in a communication network using a subscriber identification module (e.g: SIM card) 224 (e.g., the SIM card). According to an embodiment of the present disclosure, the cellular module 221 can perform at least some of the functions that the AP 210 can provide. According to an embodiment of the present disclosure, the cellular module 221 can include a communication processor (CP).

For example, each of the Wi-Fi module 223, the BT module 225, the GNSS module 227, and the NFC module 228 can include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 can be included in one Integrated Chip (IC) or IC package.

The RF module 229, for example, can transmit/receive a communication signal (e.g., an RF signal). The RF module 229 can include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 can transmit/receive an RF signal through a separate RF module.

The subscriber identification module 224 can include, for example, a card including a subscriber identity module and/or an embedded SIM, and can contain unique identification information (e.g., an Integrated Circuit Card Identifier (ICCID)) or subscriber information (e.g., an International Mobile Subscriber Identity (IMSI)).

The memory 230 (e.g., the memory 130) can include, for example, an embedded memory 232 or an external memory 234. The embedded memory 232 can include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 can further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 can be functionally and/or physically connected to the electronic device 201 through various interfaces.

The sensor module 240, for example, can measure a physical quantity or detect an operation state of the electronic device 201, and can convert the measured or detected information into an electrical signal. The sensor module 240 can include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance sensor 240K, and a Ultra Violet (UV) sensor 240M. Additionally or alternatively, the sensor module 240 can include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 can further include a control circuit for controlling one or more sensors included therein. According to an embodiment of the present disclosure, the electronic device 201 can further include a processor configured to control the sensor module 240, as a part of the processor 210 or separately from the processor 210, and can control the sensor module 240 while the processor 210 is in a sleep state.

The input device 250 can include, for example, a touch panel 252, a (digital) pen sensor 254, a key 256, or an ultrasonic input device 258. The touch panel 252 can use, for example, at least one of a capacitive type, a resistive type, an infrared type, and an ultrasonic type. The touch panel 252 can further include a control circuit. The touch panel 252 can further include a tactile layer, and provide a tactile reaction to the user.

The (digital) pen sensor 254 can include, for example, a recognition sheet which is a part of the touch panel or is separated from the touch panel. The key 256 can include, for example, a physical button, an optical key or a keypad. The ultrasonic input device 258 can detect, through a microphone (e.g., the microphone 288), ultrasonic waves generated by an input tool, and identify data corresponding to the detected ultrasonic waves.

The display 260 (e.g., the display 160) can include a panel 262, a hologram device 264, or a projector 266. The panel 262 can include a configuration identical or similar to the display 160 illustrated in FIG. 1. The panel 262 can be implemented to be, for example, flexible, transparent, or wearable. The panel 262 can be embodied as a single module with the touch panel 252. The hologram device 264 can show a three dimensional (3D) image in the air by using an interference of light. The projector 266 can project light onto a screen to display an image. The screen can be located, for example, in the interior of or on the exterior of the electronic device 201. According to an embodiment of the present disclosure, the display 260 can further include a control circuit for controlling the panel 262, the hologram device 264, or the projector 266.

The interface 270 can include, for example, a High-Definition Multimedia Interface (HDMI) 272, a Universal Serial Bus (USB) 274, an optical interface 276, or a D-sub-miniature (D-sub) 278. The interface 270 can be included in, for example, the communication interface 170 illustrated in FIG. 1. Additionally or alternatively, the interface 270 can include, for example, a Mobile High-definition Link (MHL) interface, a Secure Digital (SD) card/Multi-Media Card (MMC) interface, or an Infrared Data Association (IrDA) standard interface.

The audio module 280, for example, can bilaterally convert a sound and an electrical signal. At least some components of the audio module 280 can be included in, for example, the input/output interface 150 illustrated in FIG. 1. The audio module 280 can process voice information input or output through, for example, a speaker 282, a receiver 284, earphones 286, or the microphone 288.

The camera module 291 is, for example, a device which can photograph a still image and a video. According to an embodiment of the present disclosure, the camera module 291 can include one or more image sensors (e.g., a front sensor or a back sensor), a lens, an Image Signal Processor (ISP) or a flash (e.g., LED or xenon lamp).

The power management module 295 can manage, for example, power of the electronic device 201. According to an embodiment of the present disclosure, the power management module 295 can include a Power Management Integrated Circuit (PMIC), a charger Integrated Circuit (IC), or a battery or fuel gauge. The PMIC can use a wired and/or wireless charging method. Examples of the wireless charging method can include, for example, a magnetic resonance method, a magnetic induction method, an electromagnetic wave method, and the like. Additional circuits (e.g., a coil loop, a resonance circuit, a rectifier, etc.) for wireless charging can be further included. The battery gauge can measure, for example, a residual quantity of the battery 296, and a voltage, a current, or a temperature while charging. The battery 296 can include, for example, a rechargeable battery and/or a solar battery.

The indicator 297 can display a particular state (e.g., a booting state, a message state, a charging state, or the like) of the electronic device 201 or a part (e.g., the processor 210) of the electronic device 201. The motor 298 can convert an electrical signal into a mechanical vibration, and can generate a vibration, a haptic effect, or the like. Although not illustrated, the electronic device 201 can include a processing device (e.g., a GPU) for supporting a mobile TV. The processing device for supporting a mobile TV can process, for example, media data according to a certain standard such as Digital Multimedia Broadcasting (DMB), Digital Video Broadcasting (DVB), or mediaFLO™.

Each of the above-described component elements of hardware according to the present disclosure can be configured with one or more components, and the names of the corresponding component elements can vary based on the type of electronic device. In various embodiments, the electronic device can include at least one of the above-described elements. Some of the above-described elements can be omitted from the electronic device, or the electronic device can further include additional elements. Also, some of the hardware components according to various embodiments can be combined into one entity, which can perform functions identical to those of the relevant components before the combination.

Figure 3:
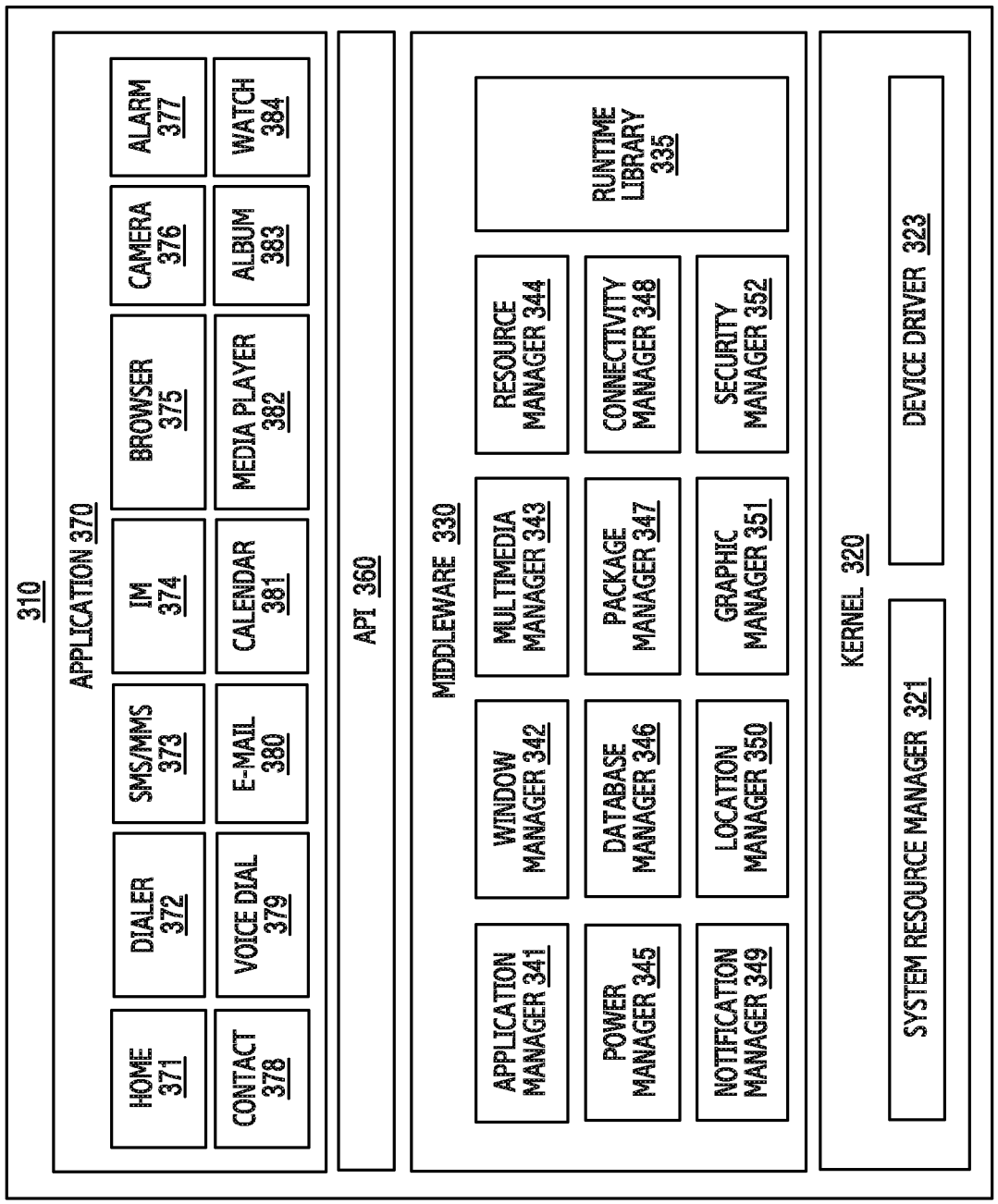
FIG. 3 is a block diagram illustrating a program module according to various exemplary embodiments.

FIG. 3 is a block diagram of a program module according to various embodiments of the present disclosure.

According to an embodiment of the present disclosure, the program module 310 (e.g., the program 140) can include an Operating System (OS) for controlling resources related to the electronic device (e.g., the electronic device 101) and/or various applications (e.g., the application programs 147) executed in the operating system. The operating system can be, for example, Android™, iOS™, Windows™, Symbian™, Tizen™, Bada™, or the like.

The program module 310 can include a kernel 320, middleware 330, an API 360, and/or applications 370. At least some of the program module 310 can be preloaded on an electronic device, or can be downloaded from an external electronic device (e.g., the electronic device 102 or 104, or the server 106).

The kernel 320 (e.g., the kernel 141) can include, for example, a system resource manager 321 and/or a device driver 323. The system resource manager 321 can control, allocate, or collect system resources. According to an embodiment of the present disclosure, the system resource manager 321 can include a process management unit, a memory management unit, a file system management unit, and the like. The device driver 323 can include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 can provide a function required in common by the applications 370, or can provide various functions to the applications 370 through the API 360 so as to enable the applications 370 to efficiently use the limited system resources in the electronic device. According to an embodiment of the present disclosure, the middleware 330 (e.g., the middleware 143) can include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include a library module that a compiler uses in order to add a new function through a programming language while an application 370 is being executed. The runtime library 335 can perform input/output management, memory management, the functionality for an arithmetic function, or the like.

The application manager 341 can manage, for example, a life cycle of at least one of the applications 370. The window manager 342 can manage Graphical User Interface (GUI) resources used by a screen. The multimedia manager 343 can recognize a format required for reproduction of various media files, and can perform encoding or decoding of a media file by using a codec suitable for the corresponding format. The resource manager 344 can manage resources of a source code, a memory, and a storage space of at least one of the applications 370.

The power manager 345 can operate together with, for example, a Basic Input/Output System (BIOS) or the like to manage a battery or power source and can provide power information or the like required for the operations of the electronic device. The database manager 346 can generate, search for, and/or change a database to be used by at least one of the applications 370. The package manager 347 can manage installation or an update of an application distributed in a form of a package file.

For example, the connectivity manager 348 can manage wireless connectivity such as Wi-Fi or Bluetooth. The notification manager 349 can display or notify of an event such as an arrival message, promise, proximity notification, and the like in such a way that does not disturb a user. The location manager 350 can manage location information of an electronic device. The graphic manager 351 can manage a graphic effect which will be provided to a user, or a user interface related to the graphic effect. The security manager 352 can provide all security functions required for system security, user authentication, or the like. According to an embodiment of the present disclosure, when the electronic device (e.g., the electronic device 101) has a telephone call function, the middleware 330 can further include a telephony manager for managing a voice call function or a video call function of the electronic device.

The middleware 330 can include a middleware module that forms a combination of various functions of the above-described components. The middleware 330 can provide a module specialized for each type of OS in order to provide a differentiated function. Further, the middleware 330 can dynamically remove some of the existing components or add new components.

The API 360 (e.g., the API 145) is, for example, a set of API programming functions, and can be provided with a different configuration according to an OS. For example, in the case of Android or iOS, one API set can be provided for each platform. In the case of Tizen, two or more API sets can be provided for each platform.

The applications 370 (e.g., the application programs 147) can include, for example, one or more applications which can provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information).

According to an embodiment of the present disclosure, the applications 370 can include an application (hereinafter, referred to as an "information exchange application" for convenience of description) that supports exchanging information between the electronic device (e.g., the electronic device 101) and an external electronic device (e.g., the electronic device 102 or 104). The information exchange application can include, for example, a notification relay application for transferring specific information to an external electronic device or a device management application for managing an external electronic device.

For example, the notification relay application can include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application can receive notification information from, for example, an external electronic device and provide the received notification information to a user.

The device management application can manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 can include applications (e.g., a health care application of a mobile medical appliance or the like) designated according to an external electronic device (e.g., attributes of the electronic device 102 or 104). According to an embodiment of the present disclosure, the applications 370 can include an application received from an external electronic device (e.g., the server 106, or the electronic device 102 or 104). According to an embodiment of the present disclosure, the applications 370 can include a pre-loaded application or a third party application that can be downloaded from a server. The names of the components of the program module 310 of the illustrated embodiment of the present disclosure can change according to the type of operating system.

According to various embodiments, at least a part of the programming module 310 can be implemented in software, firmware, hardware, or a combination of two or more thereof. At least some of the program module 310 can be implemented (e.g., executed) by, for example, the processor (e.g., the processor 210). At least some of the program module 310 can include, for example, a module, a program, a routine, a set of instructions, and/or a process for performing one or more functions.

The term "module" as used herein can, for example, mean a unit including one of hardware, software, and firmware or a combination of two or more of them. The "module" can be interchangeably used with, for example, the term "unit", "logic", "logical block", "component", or "circuit". The "module" can be a minimum unit of an integrated component element or a part thereof. The "module" can be a minimum unit for performing one or more functions or a part thereof. The "module" can be mechanically or electronically implemented. For example, the "module" according to the present disclosure can include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (e.g., modules or functions thereof) or the method (e.g., operations) according to the present disclosure can be implemented by a command stored in a computer-readable storage medium in a programming module form. The instruction, when executed by a processor (e.g., the processor 120), can cause the one or more processors to execute the function corresponding to the instruction. The computer-readable recoding media can be, for example, the memory 130.

An electronic device according to various exemplary embodiments can include a communication module supporting a plurality of communication channels that include a first communication channel and a second communication channel, and a processor operatively coupled with the communication module. The processor can be set to use the first communication channel to establish a first communication connection between the electronic device and another electronic device, while the first communication connection has been established, check a second communication connection between the electronic device and a first access point using the second communication channel, and based on the checking, change a channel for the first communication connection from the first communication channel to the second communication channel.

The processor can be set to transmit a signal including the second communication channel, to the other electronic device which the first communication connection is established with, through the communication module.

The processor can be set to receive information on a third communication connection between the other electronic device and a second access point, from the other electronic device, and based on the second communication connection and the third communication connection, determine a channel change or non-change of the second communication connection.

The processor can be set to maintain a channel of the second communication connection in case where the number of electronic devices connected to the first access point is equal to or is less than a reference value or a Basic Service Set (BSS) load element of the first access point is equal to or is less than a reference value, and change a channel of the first communication connection identically with a channel of the third communication connection in case where the number of electronic device connected to the second access point is equal to or is less than a reference value, or a BSS load element of the second access point is equal to or is less than a reference value.

The processor can be set to receive information on a third communication connection between the other electronic device and a second access point, from the other electronic device, and based on the second communication connection and the third communication connection, determine a change or non-change of the second communication connection or the third communication connection.

The processor is configured to change the second communication connection connected with the first access point into the second access point in case where it is at least one among that the number of electronic devices connected to the first access point is equal to or is less than a reference value, that a signal strength of the first access point is equal to or is less than a reference value, and/or that a BSS load element of the first access point is equal to or is less than a reference value, and change a third communication connection connected with the second access point into the first access point in case where it is at least one among that the number of electronic devices connected to the second access point is equal to or is less than a reference value, that a signal strength of the second access point is equal to or is less than a reference value, and/or that a BSS load element of the second access point is equal to or is less than a reference value.

The processor is configured to, when changing the second communication connection, release the second communication connection connected with the first access point, and establish a second communication connection with the second access point based on the third communication connection.

The processor can be set to, in case where changing the third communication connection, transmit to the other electronic device a roaming signal instructing to change the third communication connection connected with the second access point into a connection with the first access point.

The communication module can be set to communicate with the other electronic device through the first communication connection by a first protocol, and communicate with the first access point through the second communication connection by a second protocol.

The first protocol can include Wireless Fidelity (Wi-Fi) direct, and the second protocol can include Wi-Fi.

An electronic device according to various exemplary embodiments can include a communication module supporting a plurality of communication channels that include a first communication channel and a second communication channel, and a processor operatively coupled with the communication module. The processor can be set to use the first communication channel to establish a first communication connection between the electronic device and another electronic device, while the first communication connection has been established, check a second communication connection between the electronic device and a first access point using the second communication channel, based on the checking, transmit information on the second communication connection to the other electronic device, and receive a signal for changing the first communication channel into the second communication channel from the other electronic device, and change the first communication channel into the second communication channel.

The processor can be set to, while the first communication connection and the second communication connection have been established, receive a signal for changing the second communication channel into a channel related with a third communication connection between the other electronic device and a second access point, from the other electronic device, and based on the signal, change the second communication channel into the channel related with the third communication connection.

The processor can be set to, while the first communication connection and the second communication connection have been established, receive information on a third communication connection between the other electronic device and a second access point from the other electronic device, and based on the information on the third communication connection, change the second communication connection connected with the first access point into the second access point.

Figure 4:
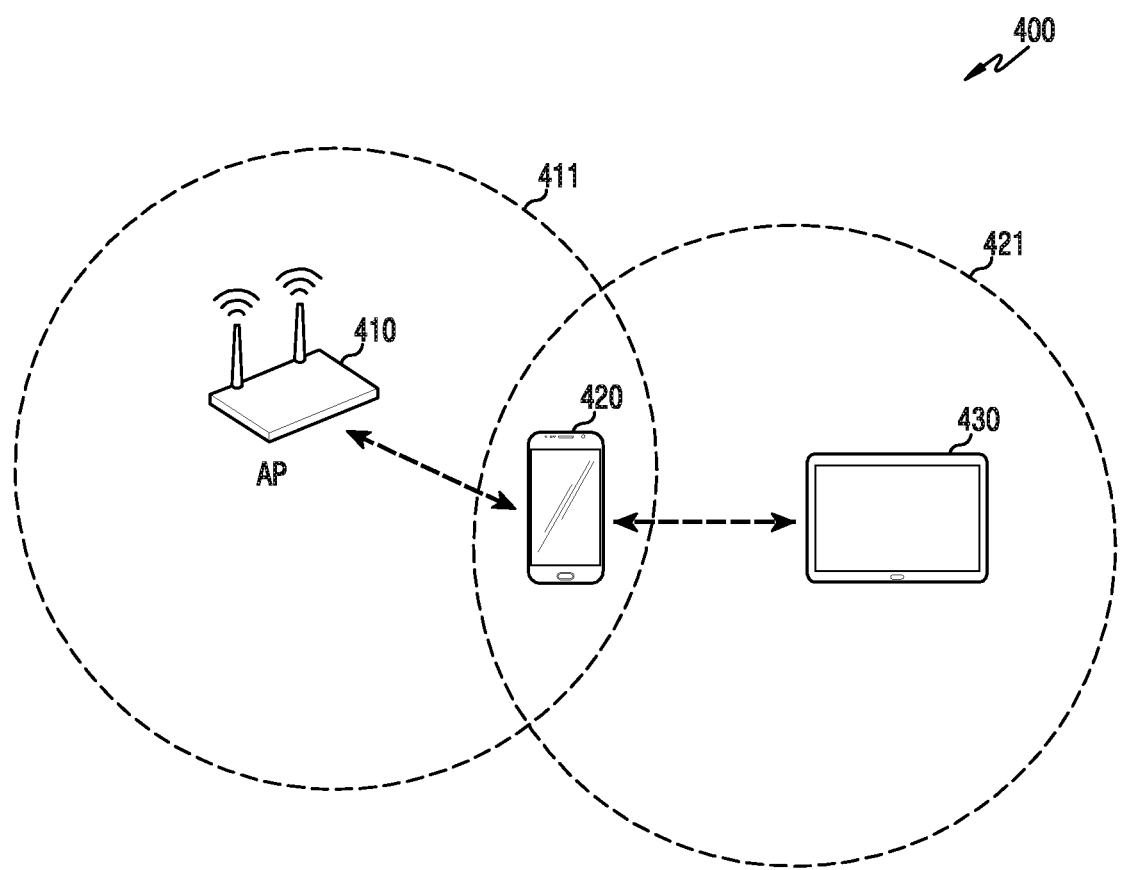
FIG. 4 is a diagram illustrating one example of a concurrent mode according to various exemplary embodiments.

FIG. 4 is a diagram illustrating one example of a concurrent mode 400 according to various exemplary embodiments.

Referring to FIG. 4, a first electronic device 420 can use Wireless-Fidelity Peer To Peer (Wi-Fi P2P) to form a 'P2P group' with a second electronic device 430. Here, the first electronic device 420 can operate as an 'owner device' of the P2P group, and the second electronic device 430 can operate as a 'client device' of the P2P group. Whether any electronic device operates as an 'owner device' and any other electronic device operates as a 'client device' in Wi-Fi P2P can be defined through a group owner negotiation process performed between electronic devices that belong to the P2P group. A process of forming the 'P2P group' (e.g., a P2P discovery procedure, a link formation procedure, a group owner negotiation procedure, etc.) corresponds to a conventional art and thus, a description thereof is omitted herein.

The first electronic device 420 can provide an Internet connection function of an access point of a WLAN network, and the second electronic device 430 can play a role of a station of the WLAN network. In a state in which the first electronic device 420 is P2P connected with the second electronic device 430, the first electronic device 420 can be connected with an Access Point (AP) 410. Or, in a state in which the second electronic device 430 is P2P connected with the first electronic device 420, the second electronic device 430 can be connected with an access point (not shown). This communication connection state can be called a concurrent mode 400.

The drawings illustrate that the first electronic device 420 and the second electronic device 430 are connected on a point-to-point basis, but the first electronic device 420 can be connected on a point-to-N basis as well. For example, the number of client devices connectable to the first electronic device 420 can be defined according to the performance of the first electronic device 420.

Also, the drawings illustrate that the second electronic device 430 connected to the first electronic device 420 is not connected with the access point 410 because a communication-possible area 411 of the access point 410 and a communication-possible area 421 of the P2P group are different from each other, but the second electronic device 430 connected to the first electronic device 420 can be also connected with the access point 410 because the communication-possible area 411 of the access point 410 and the communication-possible area 421 of the P2P group are partially overlapped with each other.

FIG. 5 is a diagram illustrating a communication channel of a concurrent mode according to various exemplary embodiments.

Figure 5A:
FIGS. 5A to 5C are diagrams illustrating a communication channel of a concurrent mode according to various exemplary embodiments.
Figure 5B:
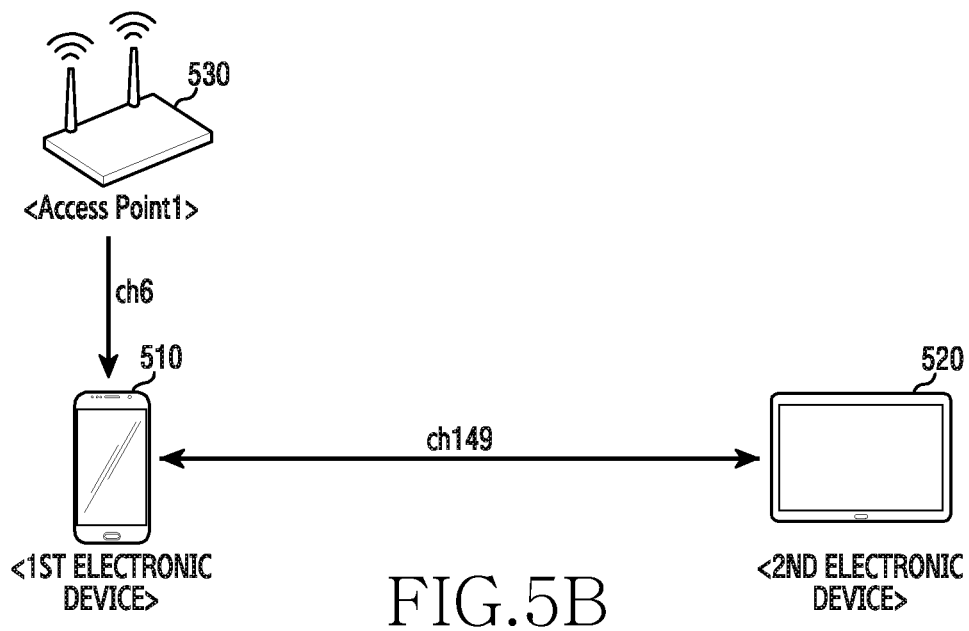

Referring to FIG. 5A, a first electronic device 510 can use a first communication channel (Ch 149) to establish a first communication connection with a second electronic device 520. Referring to FIG. 5B, while the first communication connection has been established between the first electronic device 510 and the second electronic device 520, the first electronic device 510 can use a second communication channel (Ch 6) to establish a second communication connection with an access point 1 530. This communication connection state can be a '2-way-channel concurrent mode'.

Figure 5C:
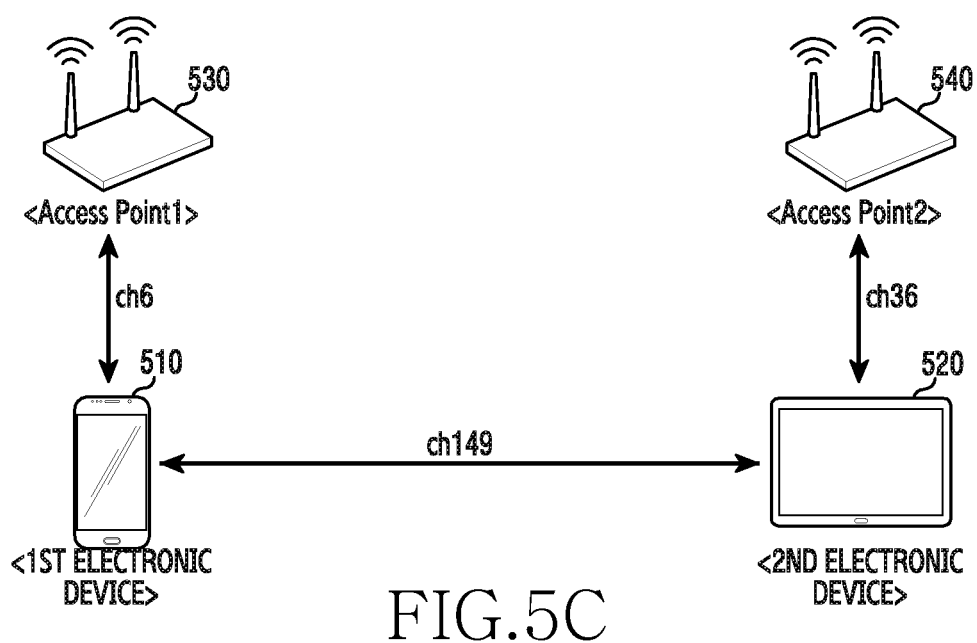

Referring to FIG. 5C, while the first communication connection has been established between the first electronic device 510 and the second electronic device 520 and the second communication connection has been established between the first electronic device 510 and the access point 1 530, the second electronic device 520 can use a third communication channel (Ch 36) to establish a third communication connection with an access point 2 540. This communication connection state can be a '3-way-channel concurrent mode'.

In this case, the first communication channel (Ch 149) communicating between the first electronic device 510 and the second electronic device 520, the second communication channel (Ch 6) between the first electronic device 510 and the access point 1 530, and the third communication channel (Ch 36) communicating between the second electronic device 520 and the access point 2 540 can be different from one another, respectively. In this case, the first electronic device 510 or the second electronic device 520 each can time divide and use each of the communication channels.

Figure 6:
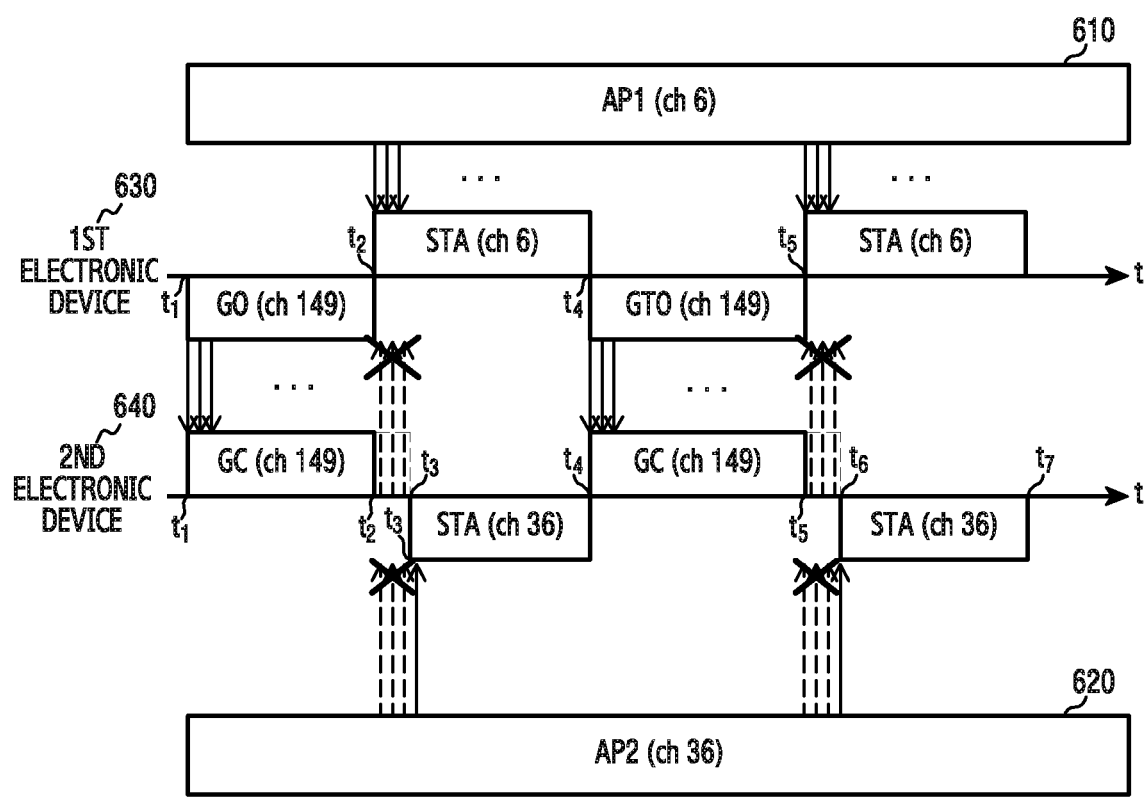
FIG. 6 is a diagram illustrating one example of switching a communication channel in a concurrent mode according to various exemplary embodiments.

FIG. 6 is a diagram illustrating one example of switching a communication channel in a concurrent mode according to various exemplary embodiments.

Referring to FIG. 6, in the concurrent mode of FIG. 5C, a first electronic device 630 and a second electronic device 640 each can time divide and use each communication channel. For example, the first electronic device 630 can switch a first communication channel (Ch 149) communicating with the second electronic device 640 and a second communication channel (Ch 6) communicating with an access point 1 (AP1) 610 in accordance with time. The second electronic device 640 can switch the first communication channel (Ch 149) communicating with the first electronic device 630 and a third communication channel (Ch 36) communicating with an access point 2 (AP2) 620 in accordance with time. However, even though the first electronic device 630 and the second electronic device 640 synchronize communication channel switching time points with each other, at any moment, the communication channel switching time point of the first electronic device 630 and the communication channel switching time point of the second electronic device 640 may not be synchronized with each other.

For example, the first electronic device 630 can maintain the first communication channel (Ch 149) at 't1', and switch from the first communication channel (Ch 149) to the second communication channel (Ch 6) at 't1'. Also, the second electronic device 640 can maintain the first communication channel (Ch 149) at 't1', and switch from the first communication channel (Ch 149) to the third communication channel (Ch 36) at 't3'. That is, because the time point 't1' at which the first electronic device 630 switches from the first communication channel (Ch 149) to the second communication channel (Ch 6) and the time point 't3' at which the second electronic device 640 switches from the first communication channel (Ch 149) to the third communication channel (Ch 36) are different from each other, the first electronic device 630 can fail in receiving a beacon frame received from the second electronic device 640. In this case, a communication connection between the first electronic device 630 and the second electronic device 640 can be disconnected.

Also, even though a communication connection between the first electronic device 630 and the second electronic device 640 is again established at a switching time point 't4', the communication connection between the first electronic device 630 and the second electronic device 640 can be again disconnected because a time point 't5' at which the first electronic device 630 switches from the first communication channel (Ch149) to the second communication channel (Ch 6) and a time point 't6' at which the second electronic device 640 switches from the first communication channel (Ch 149) to the third communication channel (Ch 36) are different from each other. These electronic devices have a problem in which frequent communication channel switching results in a deterioration of the communication performance of the electronic devices.

An electronic device described below can represent the electronic device of FIG. 1 or the electronic device of FIG. 2. However, for description convenience, the electronic device described below is described as the electronic device of FIG. 1, but the electronic device is not limited by the description. Also, from a standpoint of an owner device of a P2P group, the owner device can be a first electronic device (or electronic device 101), and a client device can be a second electronic device (or another electronic device 102 and/or 104). Also, from a standpoint of a client device of the P2P group, the client device can be the first electronic device (or electronic device 101), and an owner device can be the second electronic device (or another electronic device 102 and/or 104). This is merely for helping the understanding of the disclosure, and the first electronic device or the second electronic device is not limited by the description.

Figure 7:
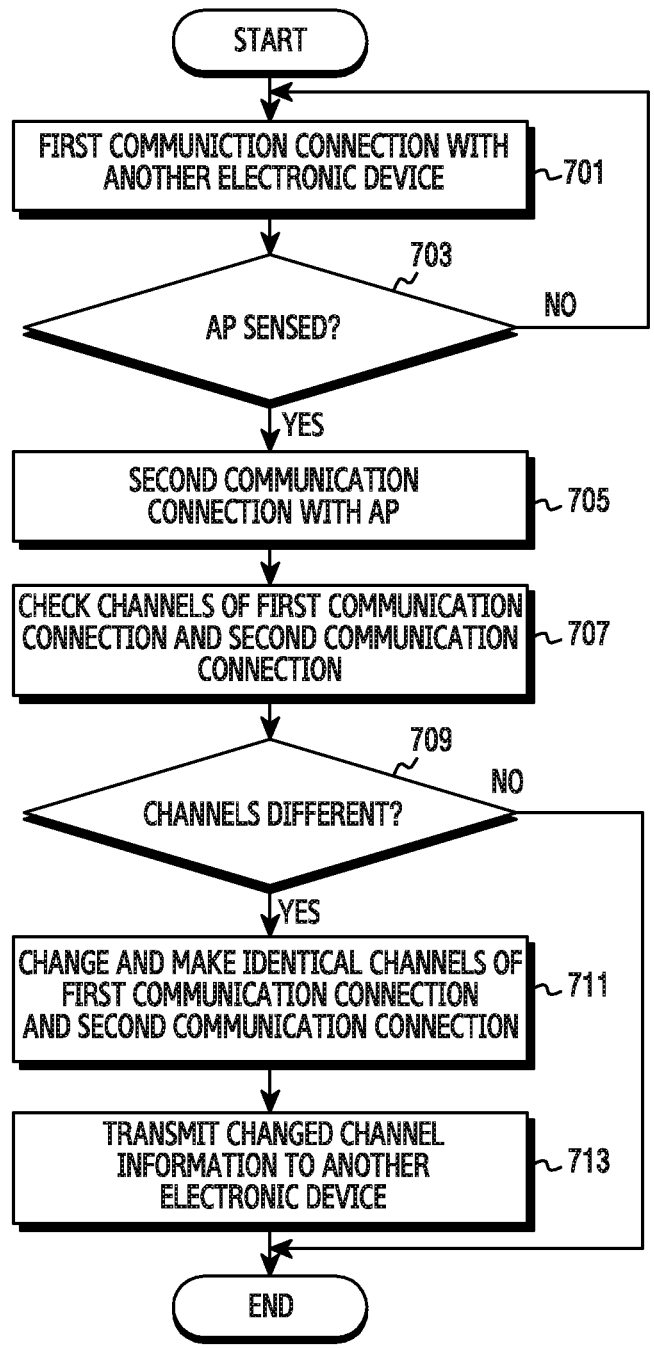
FIG. 7 is a flowchart illustrating a method for changing a communication channel in an electronic device according to various exemplary embodiments.

FIG. 7 is a flowchart illustrating a method for changing a communication channel in an electronic device according to various exemplary embodiments.

Referring to FIG. 7, in operation 701, the electronic device 101 (e.g., the processor 120) can establish a first communication connection with another electronic device (e.g., a second electronic device). For example, the processor 120 can use a first communication channel (e.g., ch 149) to establish the first communication connection with the other electronic device. Here, the electronic device 101 and the other electronic device are a P2P group and can establish a communication connection therebetween. The electronic device 101 can be an owner device of the P2P group and the other electronic device can be a client device of the P2P group. The first communication connection corresponds to a first protocol and, for example, can be 'Wi-Fi direct'.

By first performing a P2P discovery procedure and then performing a provision discovery procedure and/or a group formation procedure, the electronic device 101 and the other electronic device can establish a communication connection of the P2P group therebetween. For example, the P2P discovery procedure can be a process in which the electronic device 101 and the other electronic device first detect the existence of each other so as to form the P2P group. If a user input for executing an application using W-Fi P2P, selecting a Wi-Fi Simple Configuration (WSC) button, etc. is detected, the electronic device 101 or the other electronic device can enter a discovery mode. If entering the discovery mode, the electronic device 101 or the other electronic device can scan the whole channel in a scan method defined in 802.11. In this process, a legacy access point supporting an existing Wi-Fi interface, an owner electronic device already operating as a group owner, or even a general electronic device not yet forming a P2P group can be all scanned. The electronic device 101 or the other electronic device can check the existence or non-existence of each other by exchanging a probe request message or probe response message with each other.

If completing the P2P discovery procedure, the electronic device 101 or the other electronic device can check the existence or non-existence of each other. After completing the P2P discovery procedure, the electronic device 101 can execute the provision discovery procedure with the other electronic device that the electronic device 101 desires a communication connection with. The electronic device 101 can operate basically based on Wi-Fi Simple Configuration (WSC). Regardless of whether the WSC uses a Push Button Configuration (PBC) scheme or uses a Personal Identification Number (PIN) scheme, the electronic device 101 and the other electronic device operate the WSC within a defined time (e.g., two minutes). For this, when discovering the other electronic device and attempting a connection with the other electronic device through the WSC, the electronic device 101 can transmit a WSC configuration method of a desired scheme to the other electronic device. The other electronic device can display the WSC configuration method that the electronic device 101 desires, and inform this to a user (e.g., a user of the other electronic device). The user of the other electronic device can determine whether to accept a communication connection with the electronic device 101. Based on a user input, the other electronic device can transmit the acceptance or non-acceptance of the communication connection to the electronic device 101.

If the provision discovery procedure is ended, the electronic device 101 can proceed with the group formation procedure. The group formation procedure can be divided into a provisioning process for credential exchange through actual WSC and a group owner negotiation process. Here, the group owner negotiation process can represent that one electronic device within a P2P group plays a role of an access point as a group owner, and the remnant electronic device within the P2P group plays a role of an existing station as a group client. For example, the electronic device 101 can perform the group owner negotiation process through a message exchange of determining a role in the P2P group. For example, the group owner can be determined an electronic device having a higher intent value, through a comparison of group owner intent values.

If the group owner negotiation process is ended, the provisioning process is performed in which the electronic device 101 being the group owner operates as a WSC enroller and the other electronic device being the group client operates a WSC enrollee, to exchange a credential with each other. If this provisioning process is ended, the group formation procedure is completed in which the electronic device 101 and the other electronic device form the P2P group. If the group formation procedure is completed, the electronic device 101 moves to an actual operation channel and initiates a role of the group owner, and the other electronic device gains access to the electronic device 101 with the credential checked through provisioning, whereby the communication connection can be finally established between the electronic device 101 and the other electronic device.

In operation 703, the electronic device 101 (e.g., the processor 120) can sense an Access Point (AP). The processor 120 can scan whether an access point exists around based on setting of a user or setting of the electronic device 101. For example, the processor 120 can use the communication interface 170 to transmit a request signal (e.g., a probe request message) to an access point existing within a communication connectable area, and receive a response signal (e.g., a probe response message) from the access point responding to the request signal.

For example, if receiving the response signal from the access point through the communication interface 170, the processor 120 can perform operation 705. If failing to receive the response signal, the processor 120 can return to operation 701. The processor 120 can return to operation 701 and transmit a request signal to an access point by periods or in real-time. According to various exemplary embodiments, an operation of sensing the access point can be one of a scan process. The processor 120 can perform the scan process of repeating a listen process and a search process. In accordance with an exemplary embodiment, the scan process is not repeated indefinitely, and can end a discovery process with a certain timeout of time. Or, the processor 120 can again return to the scan process and again initiate the discovery process. This is according to an exemplary embodiment, and various exemplary embodiments are possible.

In operation 705, while the first communication connection has been established, the electronic device 101 (e.g., the processor 120) can establish a second communication connection with the sensed access point. For example, the processor 120 can use a second communication channel (e.g., ch 6) to establish the second communication connection with the access point. The response signal received from the access point includes information on the access point and, for example, can include at least one of an identifier (e.g., a Service Set IDentifier (SSID), a Basic Service Set IDentifier (BSSID), etc.) for the access point, a communication channel, the number of connectable electronic devices, a connectable frequency band, a signal strength, or a Basic Service Set (BSS) load element. The second communication connection corresponds to a second protocol and, for example, can be 'Wi-Fi'.

According to IEEE 802.11, Wi-Fi can use a band of 2.4 Giga Hertz (GHz), and has a total of fourteen channels (or communication channels), and an interval between the channels can be 5 Mega Hertz (MHz), and each channel can have a band of 22 MHz. The respective channels are not independent from one another and can be overlapped with one another.

In operation 707, the electronic device 101 (e.g., the processor 120) can check the channels of the first communication connection and the second communication connection. For example, the processor 120) can check the first communication channel (e.g., ch 149) of the first communication connection communication connected with the other electronic device and the second communication channel (e.g., ch 6) of the second communication connection communication connected with the access point.

In operation 709, the electronic device 101 (e.g., the processor 120) can determine if the checked communication channels are different from each other. For example, the first communication connection is a communication connection within a P2P group, and can have a different communication band from the second communication connection connected with the access point. For example, the first communication channel of the first communication connection can be a 5 GHz communication band, and the second communication channel of the second communication connection can be a 2.5 GHz communication band. Accordingly, the electronic device 101 (e.g., the processor 120) can provide communication channels of various communication bands, but the communication band of the first communication channel and the communication band of the second communication channel can be different from each other.

If the checked communication channels are different from each other, the processor 120 can perform operation 711. If the checked communication channels are the same as each other, the processor 120 can go to the end.

In operation 711, the electronic device 101 (e.g., the processor 120) can change and make identical the channels of the first communication connection and the second communication connection with each other. For example, the processor 120 can change the first communication channel 'ch 149' into the second communication channel 'ch 6'.

In operation 713, the electronic device 101 (e.g., the processor 120) can transmit the changed channel information to the other electronic device through the communication interface 170. For example, the processor 120 can transmit an action frame or beacon signal including the changed channel information 'ch 6', to the other electronic device. The action frame or beacon signal including the changed channel information 'ch 6' can be communication control information. Based on the changed channel information 'ch 6' (e.g., the communication control information), the other electronic device can change (or channel move) the communication channel with the electronic device 101 into 'ch 6'. This is a case in which the electronic device 101 being an owner of a P2P group requests a change of the communication channel to the other electronic device being a client of the P2P group, through Extended Channel Switching Announcement (ECSA) in a communication connection of the P2P group.

According to various exemplary embodiments, in case where the electronic device 101 (e.g., the processor 120) transmits the changed channel information and receives a response (e.g., OK) signal from the other electronic device, the processor 120 can complete a change of the first communication channel. Or, in case where the processor 120 informs the other electronic device that it will change the first communication channel from 'ch 149' to 'ch 6' and receives a response (e.g., OK) signal from the other electronic device, the processor 120 can complete a change of the first communication channel.

According to various exemplary embodiments, when the access point is available to one or more communication channels, the electronic device 101 (e.g., the processor 120) can change the second communication channel 'ch 6' into the first communication channel 'ch 149'. In this case, the processor 120 can transmit the changed channel information 'ch 149' to the access point. According to various exemplary embodiments, the processor 120 can receive changeable channel information (e.g., ch 6, ch 11, and/or ch 149) from the access point, and change the second communication channel into any one channel (e.g., ch 149) being the same as the first communication channel among the changeable channel information (e.g., ch 6, ch 11, and/or ch 149). Or, the electronic device 101 (e.g., the processor 120) can change the second communication channel and the first communication channel into any one channel 'ch 11' among changeable channel information (e.g., ch 1, ch 6, and/or ch 11), and transmit the changed channel information 'ch 11' to the access point and the other electronic device.

FIG. 8 is a diagram illustrating one example of changing a communication channel in an electronic device according to various exemplary embodiments.

Figure 8A:
FIGS. 8A to 8C are diagrams illustrating one example of changing a communication channel in an electronic device according to various exemplary embodiments.
Figure 8B:
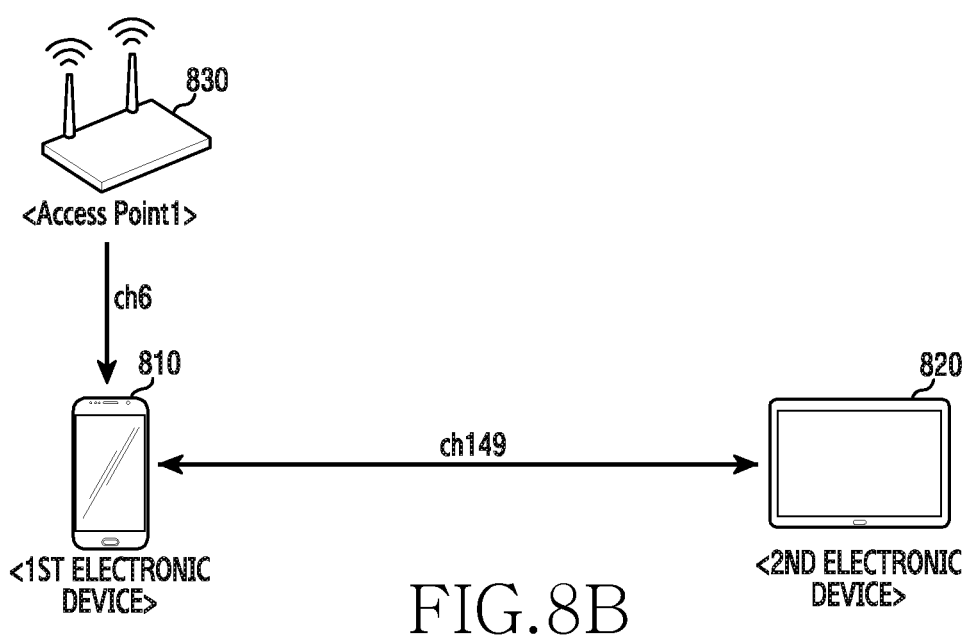
Figure 8C:
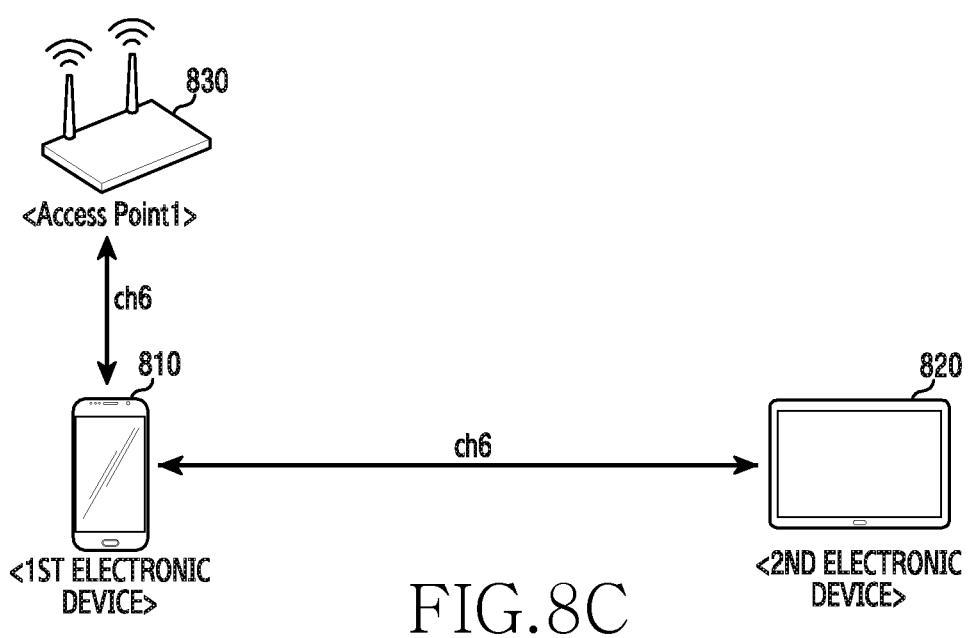

Referring to FIG. 8A, a first electronic device 810 and a second electronic device 820 can use a first communication channel (ch 149) to establish a first communication connection therebetween. Referring to FIG. 8B, while the first electronic device 810 is first communication connected with the second electronic device 820, the first electronic device 810 can be second communication connected with an access point 1 830. In FIG. 8B, the first electronic device 810 can use a second communication channel (ch 6) to establish a second communication connection with the access point 1 830. The first electronic device 810 can determine if the first communication channel (ch 149) and the second communication channel (ch 6) are different from each other. If they are different, the first electronic device 810 can change the channel to make identical the first communication channel (ch 149) and the second communication channel (ch 6) with each other. FIG. 8C illustrates one example in which the first electronic device 810 changes the channel of the first communication connection from 'ch 149' to 'ch 6'. The first electronic device 810 can transmit the changed channel information (e.g., the first communication channel (ch 6)) to the second electronic device 820. Or, though not illustrated, the first electronic device 810 can change the channel of the second communication connection into the first communication channel (ch 149), and transmit the changed channel information (e.g., the second communication channel (ch 149)) to the access point 1 830.

Figure 9:
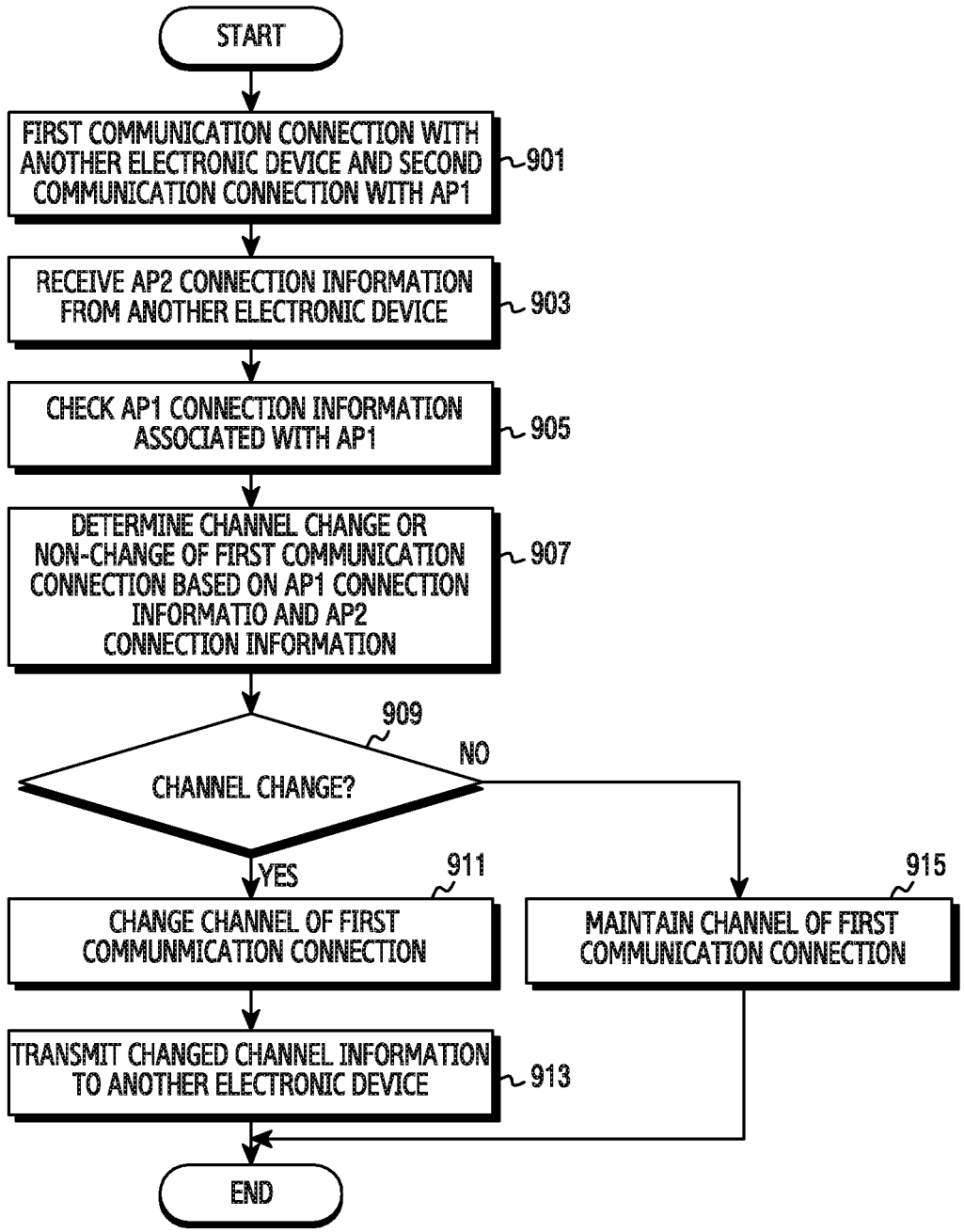
FIG. 9 is a flowchart illustrating a method for adjusting a communication channel in an electronic device according to various exemplary embodiments.

FIG. 9 is a flowchart illustrating a method for adjusting a communication channel in an electronic device according to various exemplary embodiments.

Referring to FIG. 9, in operation 901, the electronic device 101 (e.g., the processor 120) can be first communication connected with another electronic device (e.g., the second electronic device 820), and can be second communication connected with an access point 1 (e.g., the access point 1 830). For example, the processor 120 can use a first communication channel (e.g., ch 6) to establish a first communication connection with the other electronic device. The processor 120 can use a second communication channel (e.g., ch 6) to establish a second communication connection with the access point 1. For example, the first communication channel (ch 6) of the first communication connection and the second communication channel (ch 6) of the second communication connection can be the same as each other. The first communication connection corresponds to a first protocol and, for example, can be 'Wi-Fi direct'. Also, the second communication connection corresponds to a second protocol and, for example, can be 'Wi-Fi'.

In operation 903, the electronic device 101 (e.g., the processor 120) can receive AP2 connection information from the other electronic device. The processor 120 can store the AP2 connection information in the memory 130. Or, the processor 120 may not store the AP2 connection information in the memory 130. While the other electronic device is first communication connected with the electronic device 101, the other electronic device can be third communication connected with an access point 2 (e.g., the AP2). In case where a first communication channel of a first communication connection connected with the electronic device 101 and a third communication channel of a third communication connection connected with the access point 2 are different from each other, the other electronic device can transmit the AP 2 connection information on the access point 2 to the electronic device 101. Here, if operation 901 and operation 903 are carried out, a communication connection state can be a '3-way-channel concurrent mode'. The third communication connection corresponds to a third protocol and, for example, can be 'Wi-Fi direct'.

According to various exemplary embodiments, the AP2 connection information is information on the access point2 and, for example, can include at least one of an identifier (e.g., an SSID, a BSSID, etc.) for the access point 2, a communication channel, the number of connectable electronic devices, a connectable frequency band, a signal strength, or a BSS load element. At this time, the third communication channel of the third communication connection can be 'ch 36' that is a communication channel of the access point2.

In operation 905, the electronic device 101 (e.g., the processor 120) can check AP1 connection information associated with the AP1. The AP1 connection information is information on the access point 1 and, for example, can include at least one of an identifier (e.g., an SSID, a BSSID, etc.) for the access point 1, a communication channel, the number of connectable electronic devices, a connectable frequency band, a signal strength, or a BSS load element. According to various exemplary embodiments, when establishing the second communication connection with the access point 1, the processor 120 can receive the AP1 connection information from the access point 1 and store the received AP1 connection information in the memory 130. Or, for the purpose of the AP1 connection information checking, the processor 120 can request the AP1 connection information to the access point 1 through the communication interface 170 and, in response to the request, receive the AP1 connection information from the access point 1.

According to one exemplary embodiment, an access point supporting the 802.11 k standard can measure a load within a BSS that each access point covers in a beacon and probe response message, and send a BSS load element (e.g., a BSS load element) including the measured load within the BSS. The access point load element can include an element IDentifier (ID), a length, a station count, a channel utilization, and/or an available admission capacity. For BSS load balancing, the access point can transmit the BSS load element. The station count can represent a number of a station currently gaining access to the BSS. For example, the station count can represent the number of electronic devices currently gaining access to the access point. The channel utilization is a value in which the access point measures how much a current channel is busy physically or through virtual carrier sensing. The available admission capacity is a value indicating how much time is available for using admission control, and can be a value which the station (e.g., electronic device) can refer to when defining a roaming target.

In operation 907, based on the AP1 connection information and the AP2 connection information, the electronic device 101 (e.g., the processor 120) can determine a channel change or non-change of the first communication connection. For example, in case where, as a result of determining based on the AP1 connection information and the AP2 connection information, the number of electronic devices connected to the access point1 is large (e.g., the number of connected electronic devices exceeds a reference value) or a BSS load element of the access point 1 is high (e.g., the BSS load element exceeds a reference value), the processor 120 can determine that a communication state of the first communication connection is not good because traffic is generated in the access point 1.

At this time, the unit of the reference value can be a number and/or a percentage (%). The reference value can be preset by a user of the electronic device 101, or can be set as default to the electronic device 101. In this case, the processor 120 can determine that a channel change of the first communication connection is necessary. Or, in case where, as a result of determining based on the AP1 connection information and the AP2 connection information, the number of electronic devices connected to the access point 2 is large (e.g., the number of connected electronic devices exceeds a reference value) or a BSS load element of the access point 2 is high (e.g., the BSS load element exceeds a reference value), the processor 120 can determine that a communication state of the third communication connection is not good because traffic is generated in the access point 1. In this case, the processor 120 can determine that a channel change of the third communication connection is necessary, and determine that the channel change of the first communication connection is not necessary.

In operation 909, the electronic device 101 (e.g., the processor 120) can determine if the determination is the channel change. If it is the channel change, the processor 120 can perform operation 911. If it is not the channel change, the processor 120 can perform operation 915.

In operation 911, the electronic device 101 (e.g., the processor 120) can change the channel of the first communication connection. For example, the processor 120 can change the first communication channel of the first communication connection from 'ch 6' to 'ch 36'. That is, the processor 120 can change the first communication channel identically with the third communication channel.

In operation 913, the electronic device 101 (e.g., the processor 120) can transmit the changed channel information to the other electronic device through the communication interface 170. For example, the processor 120 can transmit an action frame or beacon signal including channel information which is changed from 'ch 6' to 'ch 36', to the other electronic device. Based on the changed channel information 'ch 36', the other electronic device can change (or channel move) the communication channel 'ch 6' with the electronic device 101 into 'ch 36'.

According to various exemplary embodiments, in case where the access point 1 is available to one or more communication channels (e.g., ch 1, ch 6, and/or ch 11), the processor 120 can receive a BSS load element per channel. In this case, based on the BSS load element per channel, the processor 120 can change all of the second communication channel and the first communication channel into a channel (e.g., ch1) having a low BSS load element (e.g., equal to or less than a reference value). The processor 120 can transmit the changed channel information 'ch 1' to the access point 1 and the other electronic device.

In operation 915, if the channel change is not necessary, the electronic device 101 (e.g., the processor 120) can maintain the channel of the first communication connection as the first communication channel (ch 6). Because the processor 120 does not change the first communication channel (ch 6) connected with the other electronic device, the processor 120) may not transmit an action frame or beacon signal related with a communication channel, to the other electronic device.

FIG. 10 is a diagram illustrating one example of adjusting a communication channel in an electronic device according to various exemplary embodiments.

Figure 10A:
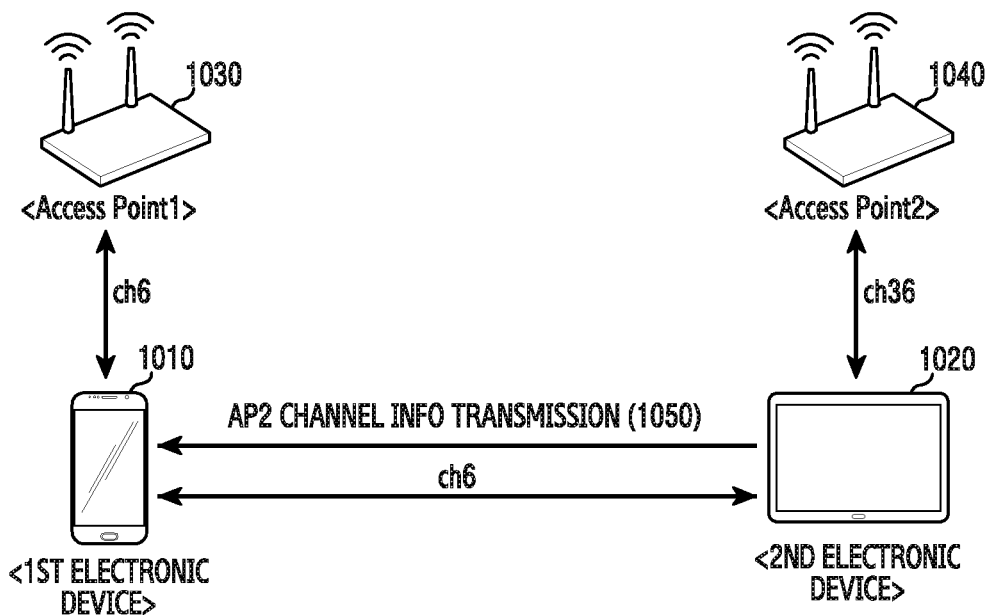
FIGS. 10A and 10B are diagrams illustrating one example of adjusting a communication channel in an electronic device according to various exemplary embodiments.

Referring to FIG. 10A, while a first electronic device 1010 uses a first communication channel (ch 6) to be first communication connected with a second electronic device 1020 and uses a second communication channel (ch 6) to be second communication connected with an access point1 1030, the first electronic device 1010 can receive AP2 connection information including AP2 channel information 1050 from the second electronic device 1020. For example, the first communication channel (ch 6) of the first communication connection and the second communication channel (ch 6) of the second communication connection can be the same as each other. The AP2 connection information can be information on an access point2 1040 that the second electronic device 1020 is third communication connected with.

Figure 10B:
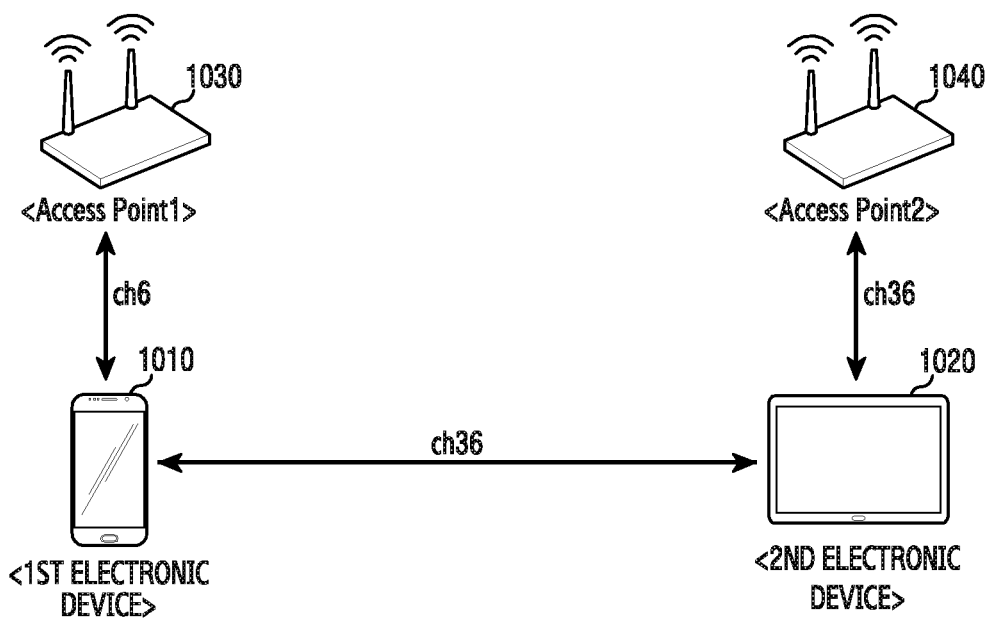

Based on AP1 connection information associated with the access point1 1030 and the AP2 connection information, the first electronic device 1010 can determine whether to change the first communication channel (ch 6) of the first communication connection. FIG. 10B illustrates one example in which the first electronic device 1010 changes the first communication channel of the first communication connection from 'ch 6' to 'ch 36'. In this case, the communication channels of the first communication connection and the third communication connection are 'ch 36' and can be the same as each other, and only the second communication channel is 'ch 6' and can be different from the others.

Or, although not illustrated, the first electronic device 1010 can maintain the first communication channel (ch 6) of the first communication connection as it is. That is, as in FIG. 10A, the first communication channel of the first communication connection and the second communication channel of the second communication connection are 'ch 6' and can be the same as each other, and only the third communication channel is 'ch 36' and can be different from the others.

Figure 11:
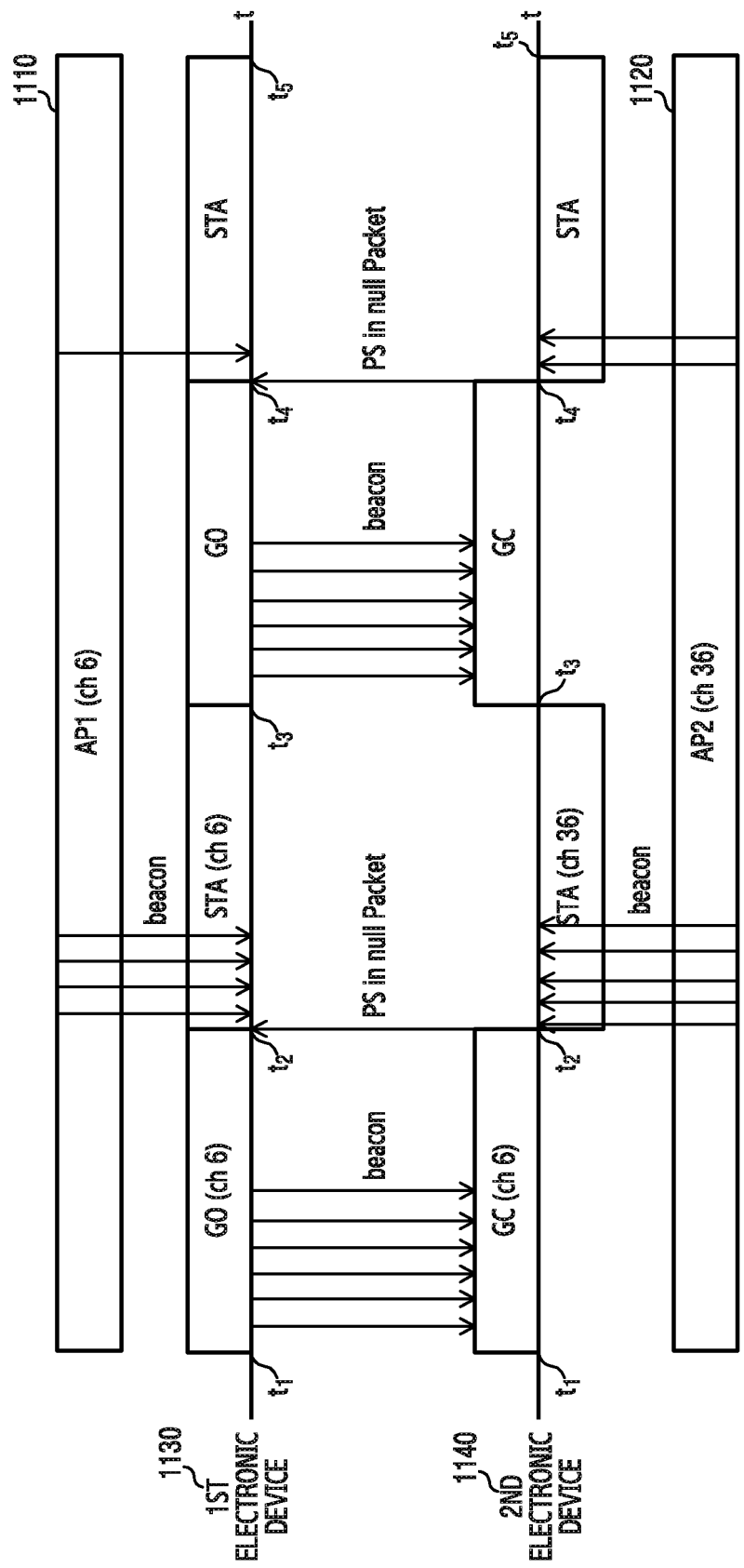
FIG. 11 is a diagram illustrating one example of switching a communication channel in an electronic device according to various exemplary embodiments.

FIG. 11 is a diagram illustrating one example of switching a communication channel in an electronic device according to various exemplary embodiments.

Referring to FIG. 11, in a concurrent mode of FIG. 10A, a first electronic device 1130 and a second electronic device 1140 each can time divide and use each communication channel. For example, because a first communication channel (ch 6) communicating with the second electronic device 1140 and a second communication channel (ch 6) communicating with an access point 1 (AP1) 1110 are the same as each other, the first electronic device 1130 may not need channel switching between the first communication channel (ch 6) and the second communication channel (ch 6). In this case, the first electronic device 1130 can receive all beacon frames transmitted from the second electronic device 1140.

The second electronic device 1040 can switch the first communication channel (ch 6) communicating with the first electronic device 1030 and a third communication channel (ch 36) communicating with an access point2 (AP1) 1120 with each other, in accordance with time. For example, the second electronic device 1040 can maintain the first communication channel (ch 6) at 't1', and switch from the first communication channel (ch 6) to the third communication channel (ch 36) at 't1'. Even in this case, the first electronic device 1130 can receive all beacon frames transmitted from the second electronic device 1140 through the first communication channel (ch 6) because the first electronic device 1130 maintains the first communication channel (ch 6) as it is without channel switching. Also, even if the second electronic device 1140 switches from the third communication channel (ch 36) to the first communication channel (ch6) at a switching time point 't3', the first electronic device 1130 can receive all beacon frames transmitted from the second electronic device 1140 through the first communication channel (ch6) because the first electronic device 1130 maintains the first communication channel (ch 6) as it is without channel switching. This can provide a seamless stable communication connection between the first electronic device 1130 and the second electronic device 1140.

Figure 12A:
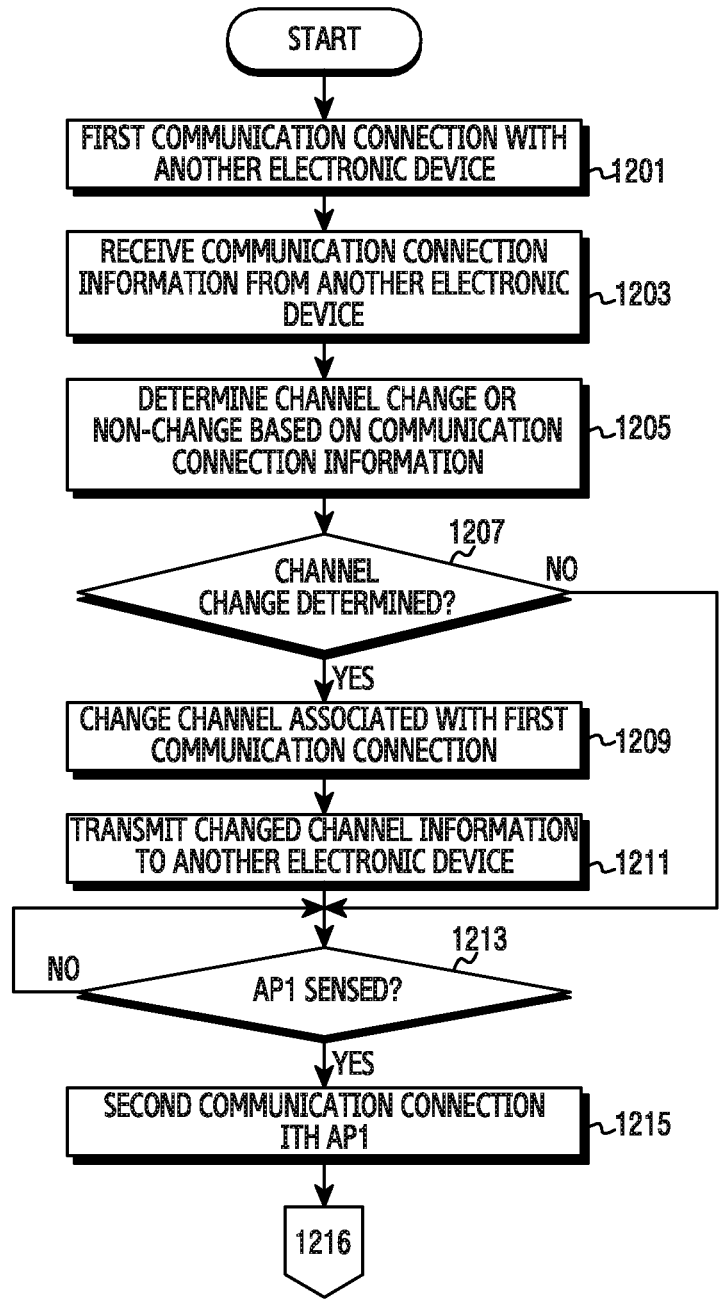
FIG. 12A and FIG. 12B are a flowchart illustrating a method for controlling communication in an electronic device according to various exemplary embodiments.
Figure 12B:
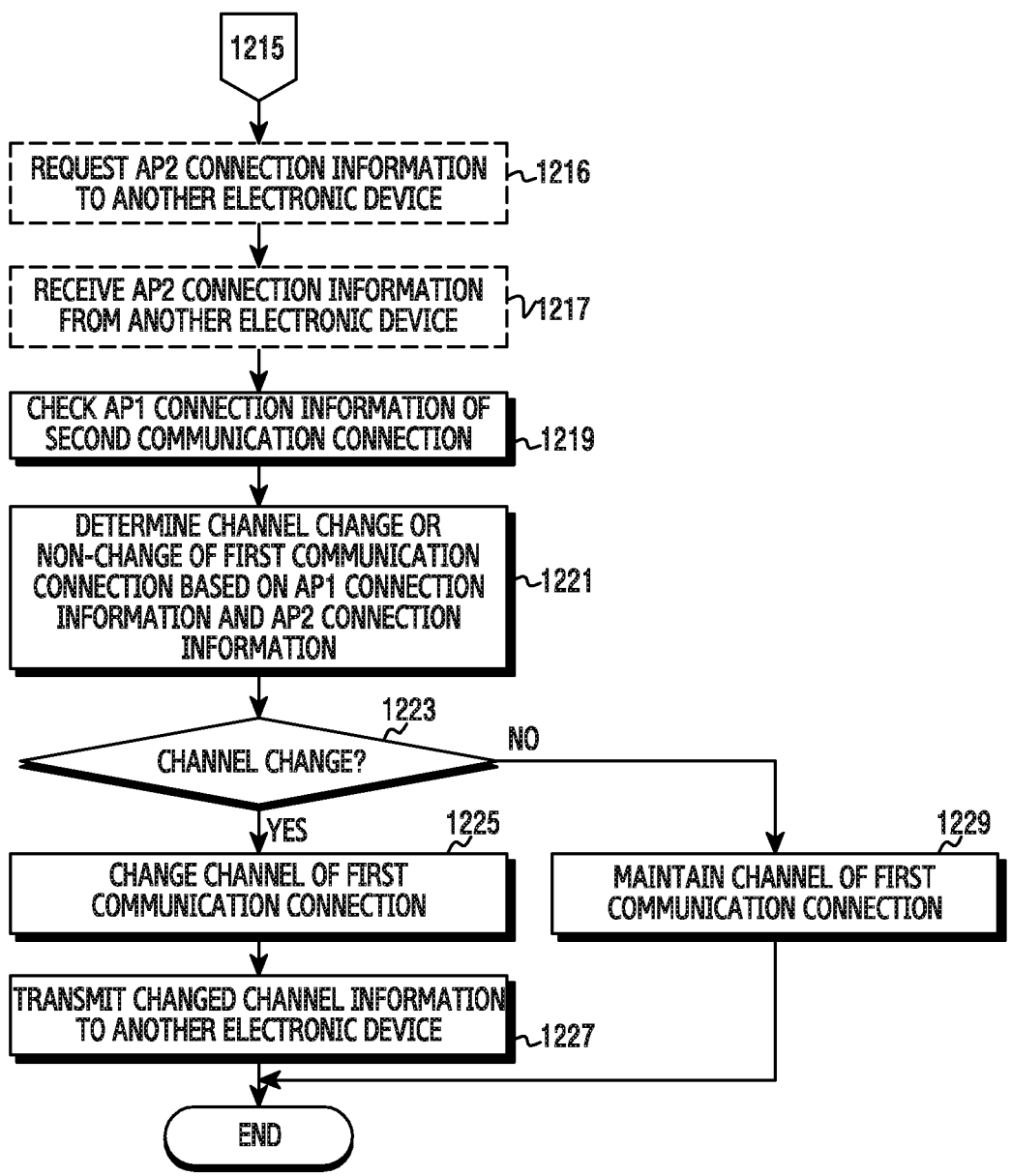

FIG. 12A and FIG. 12B are a flowchart illustrating a method for controlling communication in an electronic device according to various exemplary embodiments.

Referring to FIG. 12A, in operation 1201, the electronic device 101 (e.g., the processor 120) can be first communication connected with another electronic device (e.g., second electronic device 1140). For example, the processor 120 can use a first communication channel (e.g., ch 149) to establish a first communication connection with the other electronic device. The first communication connection corresponds to a first protocol and, for example, can be 'Wi-Fi direct'.

In operation 1203, the electronic device 101 (e.g., the processor 120) can receive communication connection information from the other electronic device through the communication interface 170. While the other electronic device is first communication connected with the electronic device 101, the other electronic device can be third communication connected with an access point 2 (e.g., the AP2 1120). In case where a first communication channel of the first communication connection connected with the electronic device 101 and a third communication channel of the third communication connection connected with the access point 2 are different from each other, the other electronic device can transmit communication connection information associated with the access point 2 to the electronic device 101. The third communication connection corresponds to a third protocol and, for example, can be 'Wi-Fi'.

According to various exemplary embodiments, the communication connection information can include only a communication channel of the access point2. Or, the communication connection information, information on the access point2, can be AP2 connection information as well. The AP2 connection information can include at least one of an identifier for the access point 2, a communication channel, the number of connectable electronic devices, a connectable frequency band, a signal strength, or a BSS load element. At this time, the third communication channel of the third communication connection can be 'ch 36' that is the communication channel of the access point 2. The processor 120 can store the communication connection information in the memory 130. Or, the processor 120 may not store the communication connection information in the memory 130.

In operation 1205, the electronic device 101 (e.g., the processor 120) can determine a channel change or nonchange based on the communication connection information. For example, the processor 120 can determine whether to change the channel of the first communication connection based on the communication connection information. In case where the third communication channel of the third communication connection and the first communication channel of the first communication connection are different from each other, the processor 120 can determine the channel change.

In operation 1207, the electronic device 101 (e.g., the processor 120) can determine if the determination is the channel change. If it is the channel change, the processor 120 can perform operation 1209. If it is not the channel change, the processor 120 can jump to operation 1213.

If it is the channel change, in operation 1209, the electronic device 101 (e.g., the processor 120) can change a channel associated with the first communication connection. For example, the processor 120 can change the first communication channel of the first communication connection identically with the third communication channel of the third communication connection. For example, the processor 120 can change the first communication channel from 'ch 149' to 'ch 36'.

In operation 1211, the electronic device 101 (e.g., the processor 120) can transmit the changed channel information to the other electronic device through the communication interface 170. For example, the processor 120 can transmit an action frame or beacon signal including the channel information, which is changed from 'ch 149' to 'ch 36', to the other electronic device.

In operation 1213, the electronic device 101 (e.g., the processor 120) can sense an access point 1 (e.g., the AP1 1110). For example, the processor 120 can scan whether an access point exists around based on setting of a user or setting of the electronic device 101. For example, the communication interface 170 can transmit a request signal (e.g., a probe request message) to an access point existing within a communication connectable area, and receive a response signal (e.g., a probe response message) from the access point responding to the request signal.

For example, if receiving the response signal from the access point1 through the communication interface 170, the processor 120 can perform operation 1215. If failing to receive the response signal from the access point1, the processor 120 can return to operation 1213. The processor 120) can repeatedly perform operation 1213 and transmit a request signal to an access point by periods or in real-time. According to various exemplary embodiments, an operation of sensing the access point 1 can be one of a scan process. The processor 120 can perform the scan process of repeating a listen process and a search process. In accordance with an exemplary embodiment, the scan process is not repeated indefinitely, and can end a discovery process with a certain timeout of time. Or, the processor 120 can again return to the scan process and again initiate the discovery process. This is according to an exemplary embodiment, and various exemplary embodiments are possible.

In operation 1215, based on the response signal received from the access point1, the electronic device 101 (e.g., the processor 120) can establish a second communication connection with the access point 1. For example, the processor 120 can use a second communication channel to establish a second communication connection with the access point1. The response signal received from the access point 1 includes information on the access point1 and, for example, can include at least one of an identifier for the access point 1, a communication channel, the number of connectable electronic devices, a connectable frequency band, a signal strength, or a BSS load element. Here, the second communication channel can be 'ch 6'. The second communication connection corresponds to a second protocol and, for example, can be 'Wi-Fi'.

Referring to FIG. 12B, in operation 1216, if the electronic device 101 (e.g., the processor 120) is second communication connected with the access point 1, the electronic device 101 (e.g., the processor 120) can request AP2 connection information to the other electronic device. In operation 1217, in response to the request, the processor 120 can receive the AP2 connection information from the other electronic device. In case where the communication connection information received in operation 1203 is the AP2 connection information, the processor 120 can omit operation 1216 and operation 1217. Or, even in case where the communication connection information received in operation 1203 is the AP2 connection information, the processor 120 can perform operation 1216 and operation 1217 for the purpose of accurate information checking. Or, in case where the communication connection information received in operation 1203 is the AP2 connection information and the AP2 connection information has not been stored in the memory 130, the processor 120 can perform operation 1216 and operation 1217. That is, operation 1216 and operation 1217 can be performed or not in accordance with an exemplary embodiment.

In operation 1219, the electronic device 101 (e.g., the processor 120) can check AP1 connection information of the second communication connection. The second communication connection is a connection with the access point 1, and the AP1 connection information can be information on the access point1. If establishing the second communication connection with the access point 1, the processor 120 can receive the AP1 connection information from the access point 1 and store the received AP1 connection information in the memory 130. Or, for the purpose of the AP1 connection information checking, the processor 120) can request the AP1 connection information to the access point1 and, in response to the request, receive the AP1 connection information from the access point1.

In operation 1221, the electronic device 101 (e.g., the processor 120) can determine a channel change or nonchange of the first communication connection based on the AP1 connection information and the AP2 connection information. For example, the processor 120 can determine if a channel change of the first communication connection is necessary based on the AP1 connection information and the AP2 connection information. In case where, as a result of determining based on the AP1 connection information and the AP2 connection information, the number of electronic devices connected to the access point1 is large (e.g., the number of connected electronic devices exceeds a reference value) or a BSS load element of the access point 1 is high (e.g., the BSS load element exceeds a reference value), the processor 120 can determine that a communication state of the first communication connection is not good because traffic is generated in the access point 1.

In this case, the processor 120 can determine that the channel change of the first communication connection is necessary. Or, in case where, as a result of determining based on the AP1 connection information and the AP2 connection information, the number of electronic devices connected to the access point 2 is large (e.g., the number of connected electronic devices exceeds a reference value) or a BSS load element of the access point 2 is high (e.g., the BSS load element exceeds a reference value), the processor 120 can determine that a communication state of the third communication connection is not good because traffic is generated in the access point2. In this case, the processor 120 can determine that the channel change of the third communication connection is necessary, and determine that the channel change of the first communication connection is not necessary.

In operation 1223, the electronic device 101 (e.g., the processor 120) can determine if the determination is the channel change. If it is the channel change, the processor 120 can perform operation 1225. If it is not the channel change, the processor 120 can perform operation 1229.

In operation 1225, the electronic device 101 (e.g., the processor 120) can change the channel of the first communication connection. For example, the processor 120 can change the first communication channel of the first communication connection from 'ch 6' to 'ch 36'. That is, the processor 120 can change the first communication channel identically with the third communication channel.

Or, in case where the electronic device 101 (e.g., the processor 120) does not determine the channel change in operation 1207, the first communication channel is 'ch 149', and the second communication channel is 'ch 6', and the third communication channel is 'ch 36', and they can be all different from one another. In this case, the processor 120 can change the first communication channel of the first communication connection from 'ch 149' to 'ch 6'. Or, the processor 120 can change the first communication channel of the first communication connection from 'ch 149' to 'ch 36'.

In operation 1227, the electronic device 101 (e.g., the processor 120) can transmit the changed channel information to the other electronic device through the communication interface 170. For example, the processor 120 can transmit an action frame or beacon signal including the changed channel information, to the other electronic device. The other electronic device can change (or channel move) the communication channel with the electronic device 101 based on the changed channel information (e.g., ch 6 and/or ch 36).

According to various exemplary embodiments, in case where the access point1 is available to one or more communication channels (e.g., ch 1, ch 6, and/or ch 11), the processor 120 can receive a BSS load element per channel. In this case, the processor 120 can change all of the second communication channel and the first communication channel into a channel (e.g., ch 1) having a low BSS load element based on the BSS load element per channel. The processor 120 can transmit the changed channel information 'ch 1' to the access point1 and the other electronic device.

If the channel change is not necessary, in operation 1229, the electronic device 101 (e.g., the processor 120) can maintain the channel of the first communication connection as the first communication channel (ch 36). This can be a case in which, as a result of determining based on the AP1 connection information and the AP2 connection information, the number of electronic devices connected to the access point 2 is not large or the BSS load element of the access point2 is not high.

Because not changing the first communication channel connected with the other electronic device, The processor 120) can not transmit an action frame or beacon signal related with the communication channel to the other electronic device.

Figure 13A:
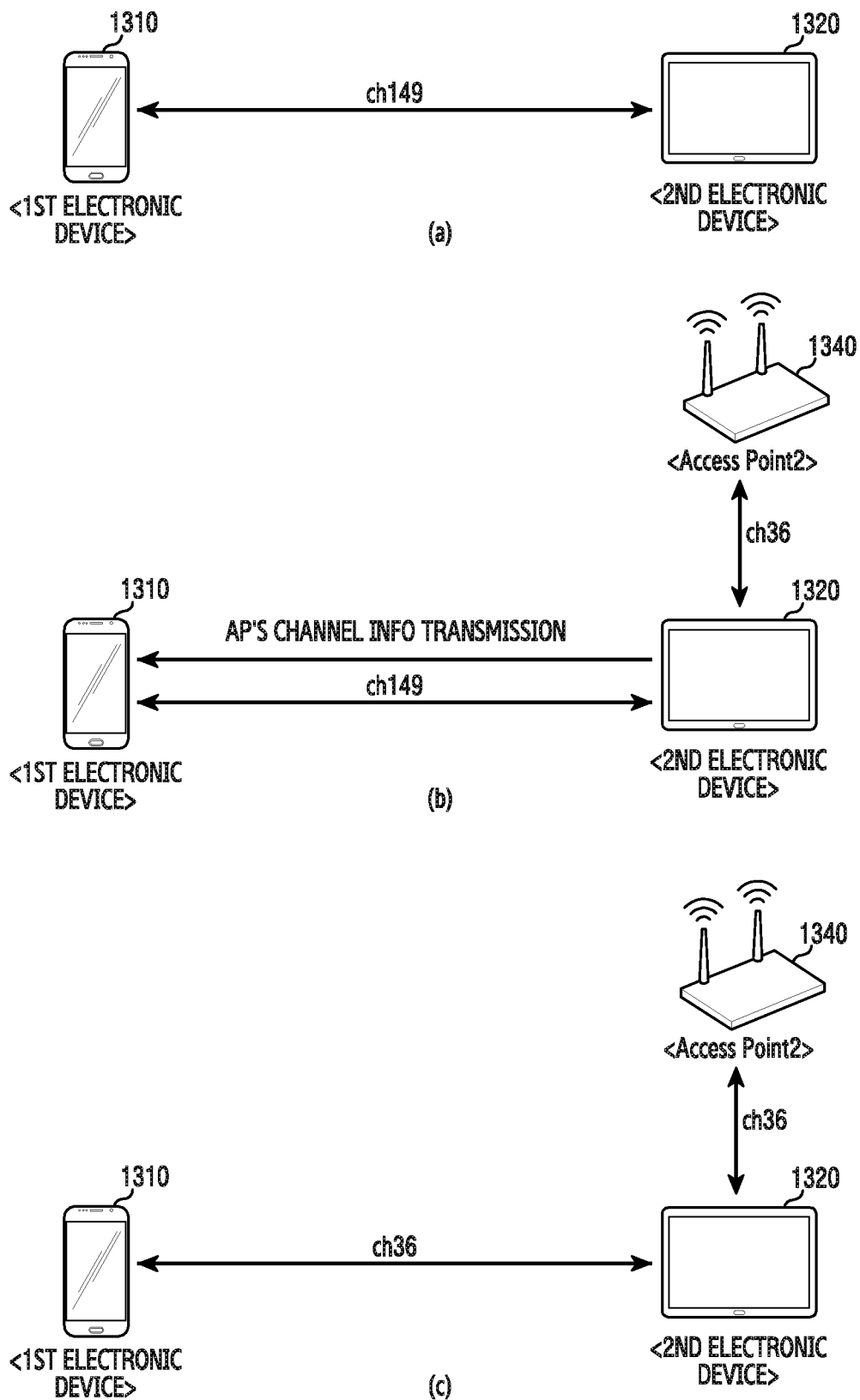
FIG. 13A and FIG. 13B are diagrams illustrating one example of changing a communication channel between an electronic device and another electronic device according to various exemplary embodiments.
Figure 13B:
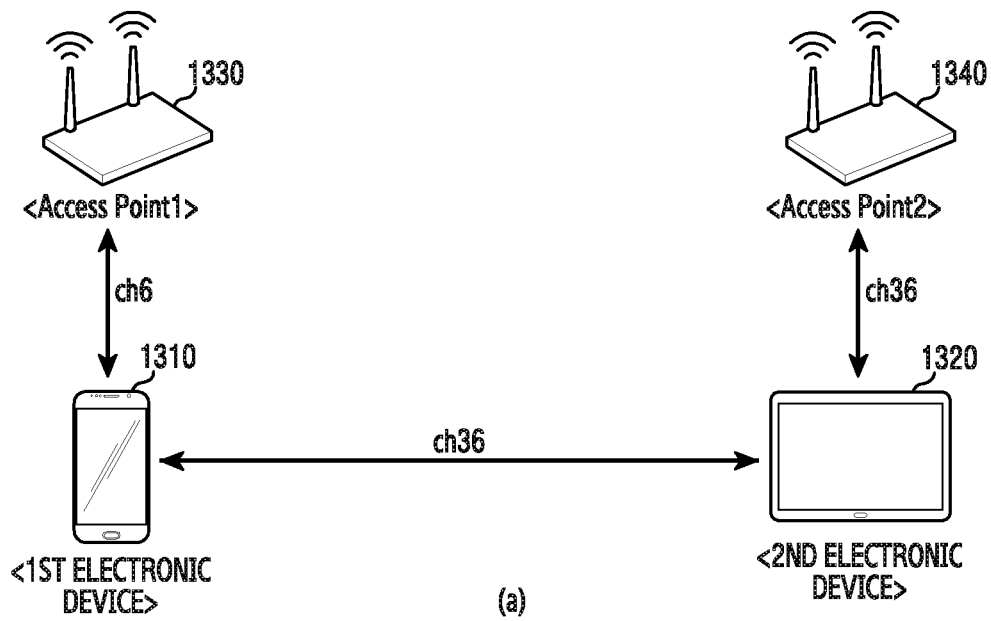
Figure 13B:
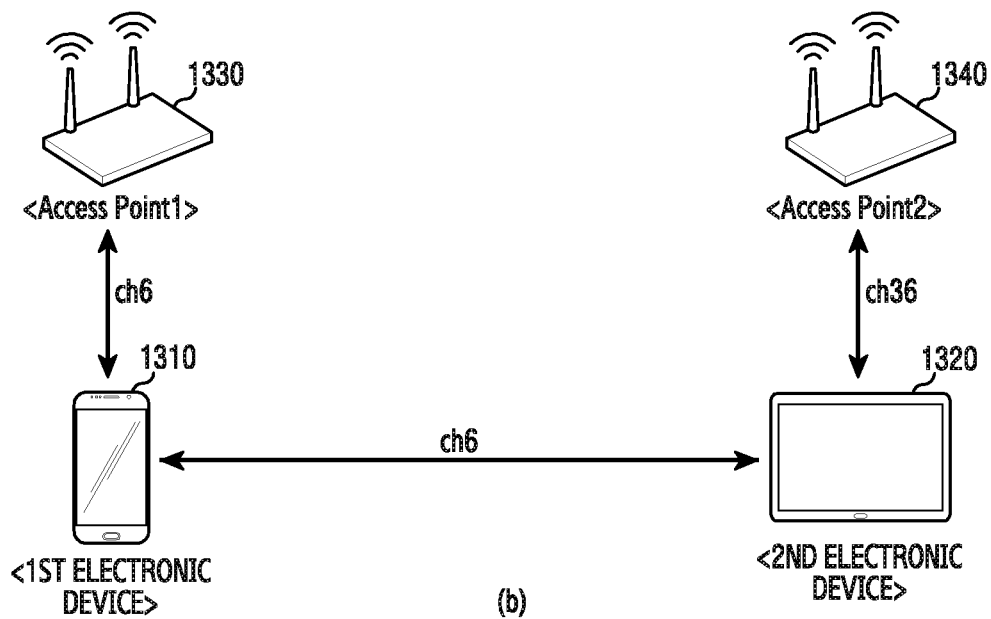

FIG. 13A and FIG. 13B are diagrams illustrating one example of changing a communication channel between an electronic device and another electronic device according to various exemplary embodiments.

FIG. 13A illustrates one example of, in case where an access point2 is connected to another electronic device, changing a communication channel between an electronic device and the other electronic device. Referring to FIG. 13A(a), a first electronic device 1310 and a second electronic device 1320 can use a first communication channel (ch 149) to establish a first communication connection therebetween. Referring to FIG. 13A(b), while the second electronic device 1320 is first communication connected with the first electronic device 1310, the second electronic device 1320 can be third communication connected with an access point2 1340. In FIG. 13A(b), the second electronic device 1320 can use a third communication channel (ch 36) to establish a third communication connection with the access point 2 1340. The second electronic device 1320 can determine if the first communication channel (ch 149) and the second communication channel (ch 36) are different from each other. If they are different, the second electronic device 1320 can transmit AP2 connection information including the third communication channel (ch 36) to the first electronic device 1310.

The first electronic device 1310 can receive the AP2 connection information from the second electronic device 1320, and determine a change or non-change of the first communication channel based on the AP2 connection information. FIG. 13A(c) illustrates one example in which the first electronic device 1310 changes the channel of the first communication connection from 'ch 149' to 'ch 36'. The first electronic device 1310 can transmit changed channel information (e.g., first communication channel (ch 36)) to the second electronic device 1320.

FIG. 13B illustrates one example of, in case where an access point1 is connected to the electronic device in a communication connection state of FIG. 13A(b), changing a communication channel between the electronic device and the other electronic device. Referring to FIG. 13B(a), while the first electronic device 1310 uses the first communication channel (ch 36) to be first communication connected with the second electronic device 1320, and the second electronic device 1320 uses the third communication channel (ch 36) to be third communication connected with the access point 2 1340, the first electronic device 1310 can establish a second communication connection with an access point 1 1330. Here, the first communication channel (ch 36) of the first communication connection and the third communication channel (ch 36) of the third communication connection can be the same as each other.

The first electronic device 1310 can determine whether to change the communication channel of the first communication connection, based on AP1 connection information associated with the access point 1 1330 and the AP2 connection information associated with the access point 2 1340. FIG. 13B(b) illustrates one example in which the first electronic device 1310 changes the first communication channel of the first communication connection from 'ch 36' to 'ch 6 '. In this case, the communication channels of the first communication connection and the second communication connection are 'ch 6' and can be the same as each other, and only the third communication channel is 'ch 36' and can be different from the others.

Or, though not illustrated, the first electronic device 1310 can maintain the first communication channel (ch 36) of the first communication connection as it is. That is, as in FIG. 13B(a), the first communication channel of the first communication connection and the third communication channel of the third communication connection are 'ch 36' and can be the same as each other, and only the second communication channel is 'ch 6' and can be different from the others.

Figure 14:
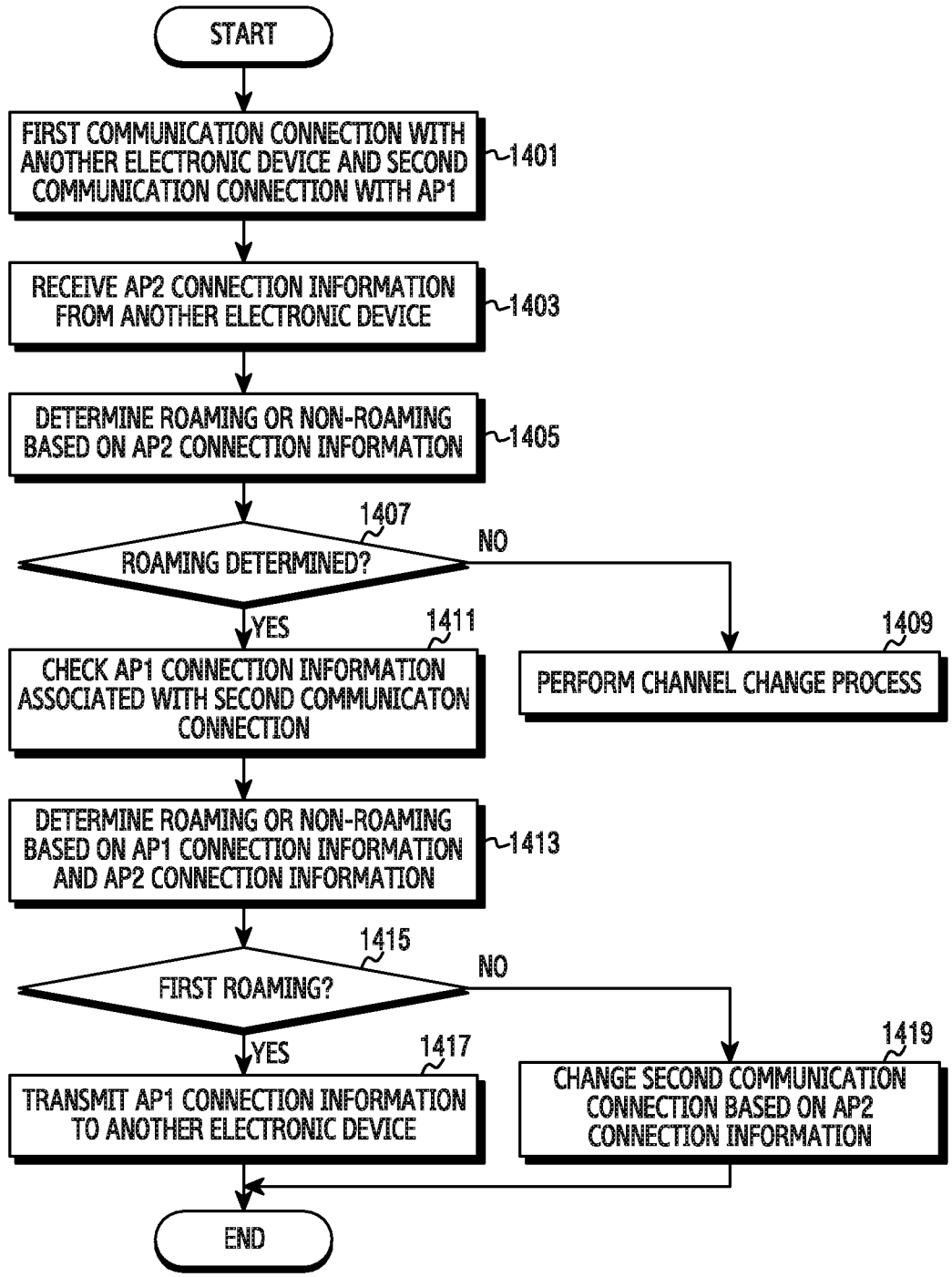
FIG. 14 is a flowchart illustrating a method for roaming in an electronic device according to various exemplary embodiments.

FIG. 14 is a flowchart illustrating a method for roaming in an electronic device according to various exemplary embodiments.

Referring to FIG. 14, in operation 1401, the electronic device 101 (e.g., the processor 120) can be first communication connected with another electronic device (e.g., the second electronic device 1320), and can be second communication connected with an access point1 (e.g., the AP1 1330). For example, the processor 120 can use a first communication channel to establish a first communication connection with the other electronic device. The processor 120 can use a second communication channel to establish a second communication connection with the access point 1. Here, the first communication channel of the first communication connection and the second communication channel of the second communication connection are 'ch 6' and can be the same as each other. Or, the first communication channel of the first communication connection is 'ch 149' and the second communication channel of the second communication connection is 'ch 6', and they can be different from each other as well.

In operation 1403, the electronic device 101 (e.g., the processor 120) can receive AP2 connection information from the other electronic device. The processor 120 can store the AP2 connection information in the memory 130. Or, the processor 120) may not store the AP2 connection information in the memory 130. While the other electronic device is first communication connected with the electronic device 101, the other electronic device can be third communication connected with an access point2 (e.g., the AP2 1340). The AP2 connection information is information on the access point2 and, for example, can include at least one of an identifier for the access point2, a communication channel, the number of connectable electronic devices, a connectable frequency band, a signal strength, or a BSS load element. In case where the first communication channel of the first communication connection connected with the electronic device 101 and the third communication channel of the third communication connection connected with the access point 2 are different from each other, the other electronic device can transmit the AP 2 connection information on the access point 2 to the electronic device 101. Here, if operation 1401 and operation 1403 are carried out, a communication connection state can be a '3-way-channel concurrent mode'.

In operation 1405, the electronic device 101 (e.g., the processor 120) can determine roaming or non-roaming based on the AP2 connection information. The roaming can mean changing an access point connected with an electronic device. For example, the roaming can mean that the other electronic device changes an access point connected to the other electronic device in accordance with the control of the electronic device 101. For example, the roaming can mean that the electronic device 101 changes the access point 1 into the access point 2, or the other electronic device changes the access point 2 into the access point 1.

For example, in operation 1405, the electronic device 101 (e.g., the processor 120) can determine if a roaming is necessary or a channel change is necessary based on the AP2 connection information. That is, the processor 120 can determine if the roaming is necessary or the channel change is necessary when a communication connection state is a '3-way-channel concurrent mode'. For example, the processor 120 can determine if the roaming is necessary or the channel change is necessary for the sake of communication performance degradation or communication stability. The processor 120) can select any one of the roaming or the channel change as a method capable of maintaining the communication stability without deteriorating communication performance.

According to various exemplary embodiments, in case where it is determined that, when the electronic device 101 connects to the access point 2 based on the AP2 connection information, it is good for communication performance, the processor 120 can determine the roaming. For example, in case where the number of electronic devices connected to the access point 2 is not large (e.g., the number of connected devices is equal to or is less than a reference value), or a signal strength of the access point 2 is strong (e.g., the signal strength exceeds a reference value), or a BSS load element is low (e.g., the BSS load element is equal to or is less than a reference value), the processor 120 can determine that the communication performance of the access point 2 is good. In this case, the processor 120 can determine the roaming to the access point 2.

Or, in case where the number of electronic devices connected to the access point 2 is large (e.g., the number of connected devices exceeds a reference value), or a signal strength of the access point 2 is weak (e.g., the signal strength is equal to or is less than a reference value), or the BSS load element is high (e.g., the BSS load element exceeds a reference value), the processor 120 can determine that the communication performance of the access point 2 is not good. In this case, the processor 120 can determine the channel change. Or, in case where the first communication channel and the second communication channel are different from each other, or in case where the first communication channel and the third communication channel are different from each other, the processor 120 can determine the channel change.

In operation 1407, the electronic device 101 (e.g., the processor 120) can determine if the determination is the roaming. For example, if it is the roaming, the processor 120 can perform operation 1411. If it is not the roaming, the processor 120 can perform operation 1409.

In operation 1409, the electronic device 101 (e.g., the processor 120) can perform a channel change process. The channel change process can determine if a channel change is necessary and, when the channel change is necessary, the channel change process can change a channel of the first communication connection or when the channel change is not necessary, the channel change process can maintain the channel of the first communication connection. For example, the processor 120 can determine a channel change or non-change based on AP1 connection information and AP 2 connection information. If the channel change is necessary, the processor 120 can change the channel of the first communication connection. If the channel change is not necessary, the processor 120 can maintain the channel of the first communication connection. This channel change process can include operation 1221 to operation 1227 earlier described in FIG. 12.

In operation 1411, the electronic device 101 (e.g., the processor 120) can check AP1 connection information associated with the second communication connection. The AP1 connection information is information on the access point 1 and, for example, can include at least one of an identifier for the access point 1, a communication channel, the number of connectable electronic devices, a connectable frequency band, a signal strength, or a BSS load element. According to various exemplary embodiments, when establishing the second communication connection with the access point 1, the processor 120 can receive the AP1 connection information from the access point 1 and store the received AP1 connection information in the memory 130. Or, for the purpose of the AP1 connection information checking, the processor 120 can request the AP1 connection information to the access point 1 through the communication interface 170 and, in response to the request, receive the AP1 connection information from the access point 1.

In operation 1413, the electronic device 101 (e.g., the processor 120) can determine roaming or non-roaming based on the AP1 connection information and the AP 2 connection information. The roaming can be distinguished into a first roaming and a second roaming. The first roaming can be for controlling the other electronic device to change an access point, and the second roaming can be for controlling the electronic device 101 to change an access point. The processor 120 can determine whether to perform the first roaming or whether to perform the second roaming based on the AP1 connection information and the AP2 connection information.

In operation 1415, the electronic device 101 (e.g., the processor 120) can determine if the determined roaming is the first roaming. According to various exemplary embodiments, in case where it is determined that when the ther electronic device connects to the access point 1, it is good for the communication performance of the other electronic device, the processor 120 can determine that it is the first roaming. For example, in case where the number of electronic devices connected to the access point 2 is large (e.g., exceeds a reference value), or a signal strength of the access point 2 is weak (e.g., is equal to or is less than a reference value), or a BSS load element of the access point 2 is high (exceeds a reference value), the processor 120 can determine the first roaming.

Or, in case where it is determined that when the electronic device 101 connects to the access point 2 instead of the access point 1, it is good for communication performance, the electronic device 101 (e.g., the processor 120) can determine the second roaming. For example, in case where the number of electronic devices connected to the access point 1 is large (e.g., exceeds a reference value), or a signal strength of the access point 1 is weak (e.g., is equal to or is less than a reference value), or a BSS load element of the access point 1 is high (exceeds a reference value), the processor 120 can determine the second roaming.

If it is the first roaming, the processor 120 can perform operation 1417. If it is not the first roaming, the processor 120 can perform operation 1419.

In operation 1417, when it is the first roaming, the electronic device 101 (e.g., the processor 120) can transmit the AP1 connection information to the other electronic device. To control the other electronic device to change an access point, the processor 120 can transmit information necessary for channel change to the other electronic device. The AP1 connection information is information necessary for connecting to the access point1. The processor 120 can transmit the AP1 connection information to the other electronic device. The other electronic device can receive the AP1 connection information and, based on the AP1 connection information, change the third communication connection. That is, based on the AP1 connection information, the other electronic device can release the third communication connection connected with the access point2, and establish a third communication connection with the access point1.

In operation 1419, when it is the second roaming, the electronic device 101 (e.g., the processor 120 can change the second communication connection based on the AP2 connection information. Because the second roaming is that the electronic device 101 changes an access point, the processor 120 can transmit no signal to the other electronic device. The AP2 connection information is information necessary for connecting to the access point 2. Based on the AP2 connection information, the processor 120) can release the second communication connection connected to the access point 1, and establish a new second communication connection with the access point2.

Figure 15A:
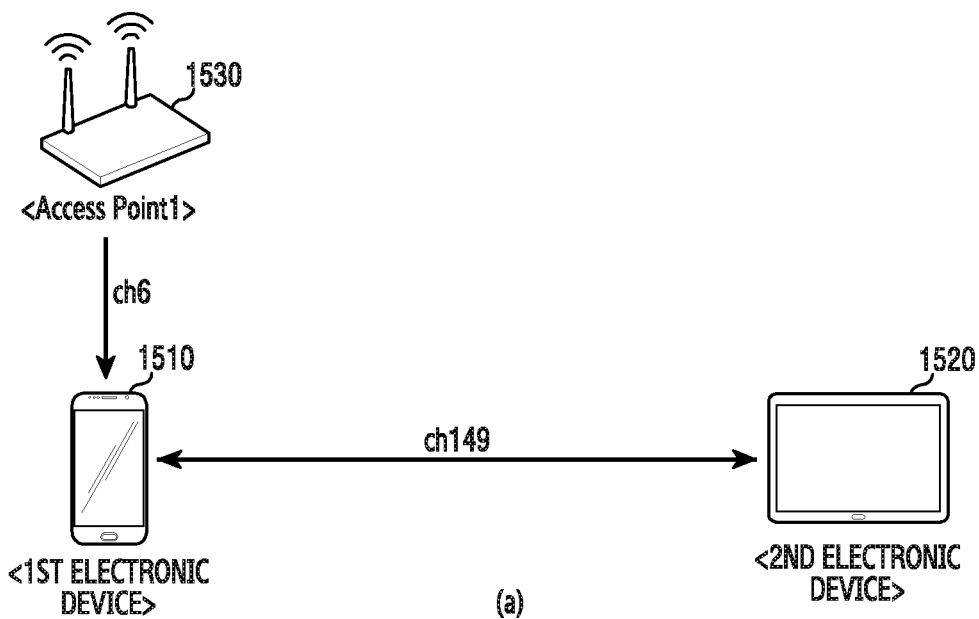
FIG. 15A to FIG. 15C are diagrams illustrating one example of controlling communication according to various exemplary embodiments.
Figure 15A:
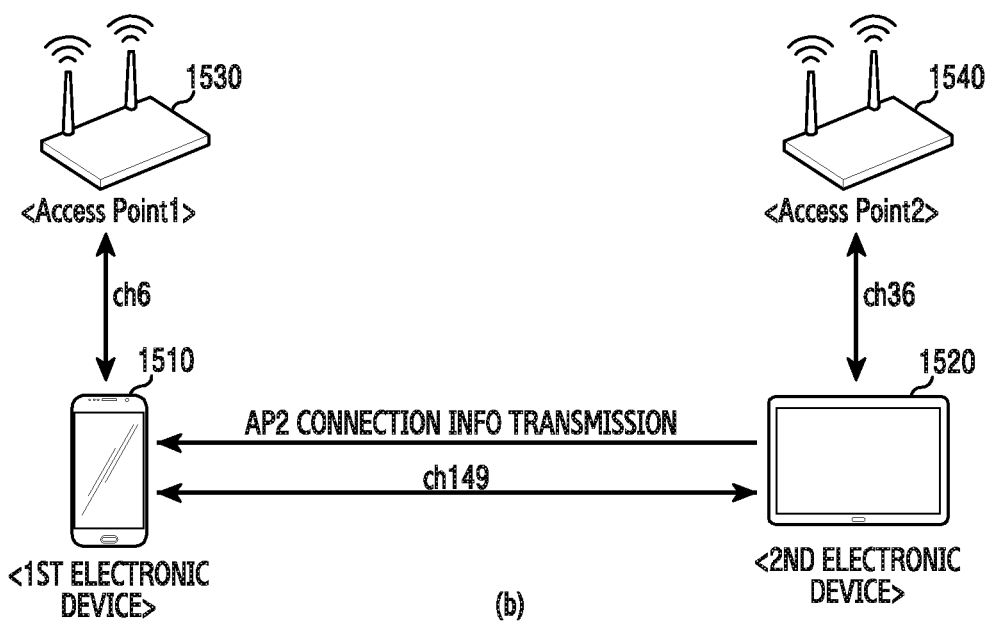
Figure 15B:
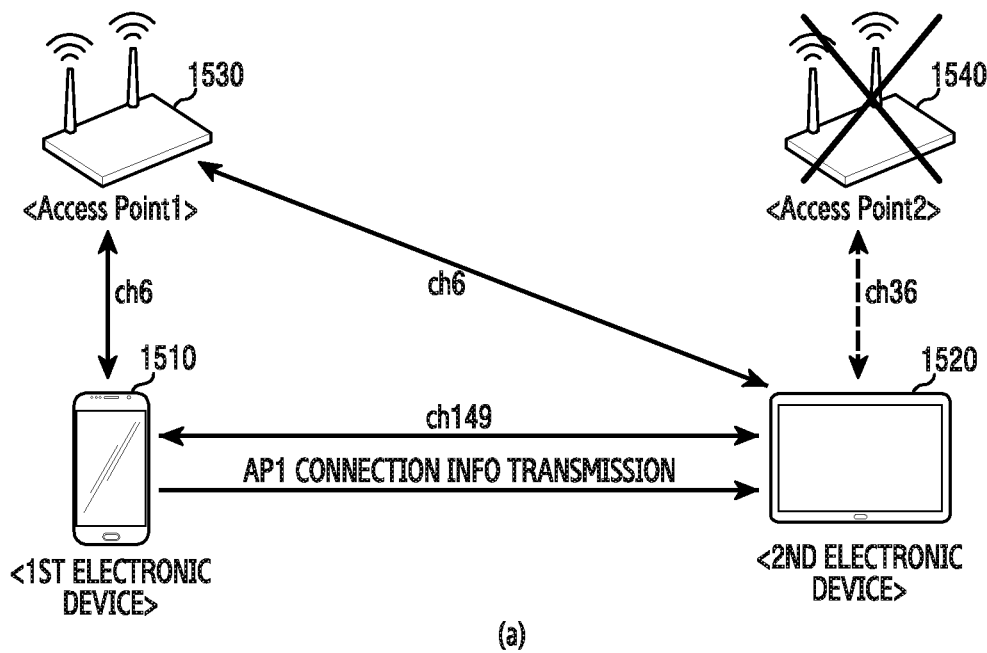
Figure 15B:
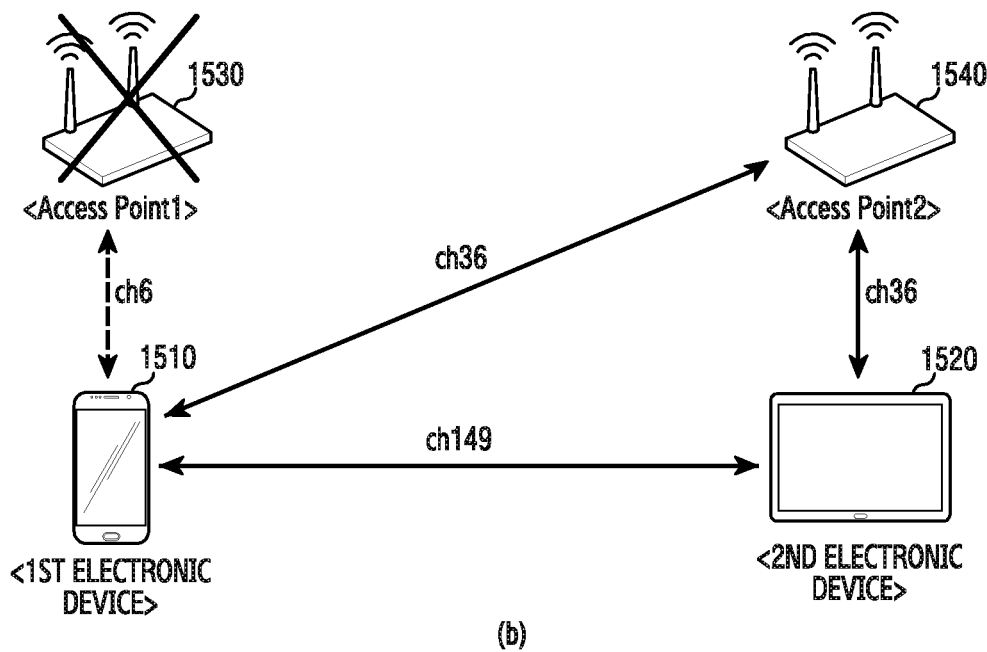
Figure 15C:
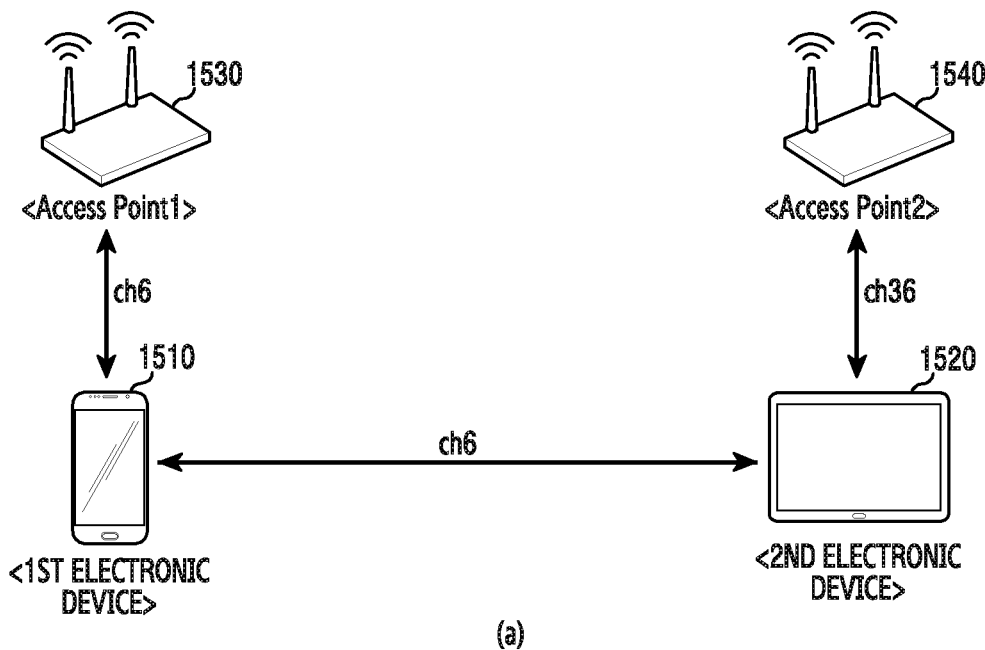
Figure 15C:
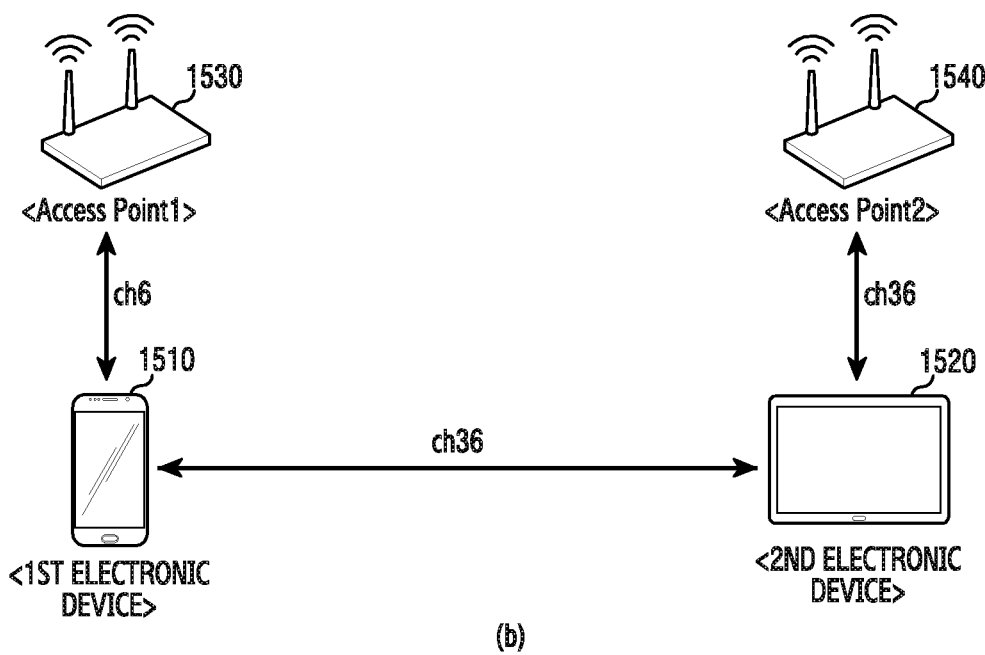

FIG. 15A to FIG. 15C are diagrams illustrating one example of controlling communication according to various exemplary embodiments.

FIG. 15A illustrates one example in which a third communication connection is established in case where a first communication channel (ch 149) of a first communication connection and a second communication channel (ch 6) of a second communication connection are different from each other.

Referring to FIG. 15A(*a*), a first electronic device 1510 can use the first communication channel (ch 149) to be first communication connected with a second electronic device 1520, and use the second communication channel (ch 6) to be second communication connected with an access point 1 (AP1) 1530. At this time, the first communication channel (ch 149) of the first communication connection and the second communication channel (ch 6) of the second communication connection can be different from each other. Referring to FIG. 15A(*b*), while the first communication connection and the second communication connection are established, the first electronic device 1510 can receive AP2 connection information 1550 from the second electronic device 1520. The AP2 connection information can be information on an access point 2 1540 that the second electronic device 1520 is third communication connected with.

The first electronic device 1510 can determine roaming or non-roaming based on AP1 connection information on an access point 1 1530 and the AP2 connection information. The roaming can be distinguished into a first roaming and a second roaming. The first roaming can be for controlling the second electronic device 1520 to change an access point, and the second roaming can be for controlling the first electronic device 1510 to change an access point.

FIG. 15B illustrates one example of roaming in case where the first communication channel (ch 149) of the first communication connection and the second communication channel (ch 6) of the second communication connection are different from each other.

Referring to FIG. 15B(*a*), the first electronic device 1510 can determine the first roaming, and transmit the AP1 connection information to the second electronic device

1520. The second electronic device 1520 can receive the AP1 connection information from the first electronic device 1510 and, based on the AP1 connection information, connect to the access point1 1530. In this case, the first communication channel is 'ch 149', and the second communication channel and the third communication channel are 'ch 6' and can be the same as each other. In FIG. 15B(*a*), two communication channels can be established in a communication connection state of a '3-way-channel concurrent mode'.

Referring also to FIG. 15B(*b*), the first electronic device 1510 can determine the second roaming, and connect to the access point 2 1540 based on the AP2 connection information. In this case, the first communication channel is 'ch 149', and the second communication channel and the third communication channel are 'ch 36' and can be the same as each other. In FIG. 15B(*b*), two communication channels can be established in a communication connection state of a '3-way-channel concurrent mode'.

FIG. 15C illustrates one example of controlling a channel in case where the first communication channel (ch 6) of the first communication connection and the second communication channel (ch 6) of the second communication connection are the same as each other, and the third communication connection is established.

Referring to FIG. 15C(*a*), the first electronic device 1510 can use the first communication channel (ch 6) to be first communication connected with the second electronic device 1520, and use the second communication channel (ch 6) to be second communication connected with the access point1 1530. At this time, the first communication channel (ch 6) of the first communication connection and the second communication channel (ch 6) of the second communication connection can be the same as each other. At this time, in case where the second electronic device 1520 is third communication connected with the access point2 1540, the first electronic device 1510 can determine a channel change or non-change. FIG. 15C(*a*) illustrates an exemplary embodiment in which, although the third communication connection is established during the first communication connection and the second communication connection, the first communication channel (ch 6) of the first communication connection is not changed. In this case, the third communication channel is 'ch 36', and the first communication channel and the second communication channel are 'ch 6' and can be the same as each other. In FIG. 15C(*a*), two communication channels can be established in a communication connection state of a '3-way-channel concurrent mode'.

Referring to FIG. 15C(*b*), the first electronic device 1510 can use the first communication channel (ch 6) to be first communication connected with the second electronic device 1520, and use the second communication channel (ch 6) to be second communication connected with the access point1 1530. At this time, the first communication channel (ch 6) of the first communication connection and the second communication channel (ch 6) of the second communication connection can be the same as each other. At this time, in case where the second electronic device 1520 is third communication connected with the access point2 540, the first electronic device 1510 can determine a channel change or non-change. FIG. 15C(*b*) illustrates an exemplary embodiment in which, if the third communication connection is established during the first communication connection and the second communication connection, the first communication channel (ch 6) of the first communication connection is changed into a channel of the third communication connection. In this case, the second communication channel is 'ch 6', and the first communication channel and the third communication channel are 'ch 36' and can be the same as each other. In FIG. 15C(*b*), two communication channels can be established in a communication connection state of a '3-way-channel concurrent mode'.

Figure 16:
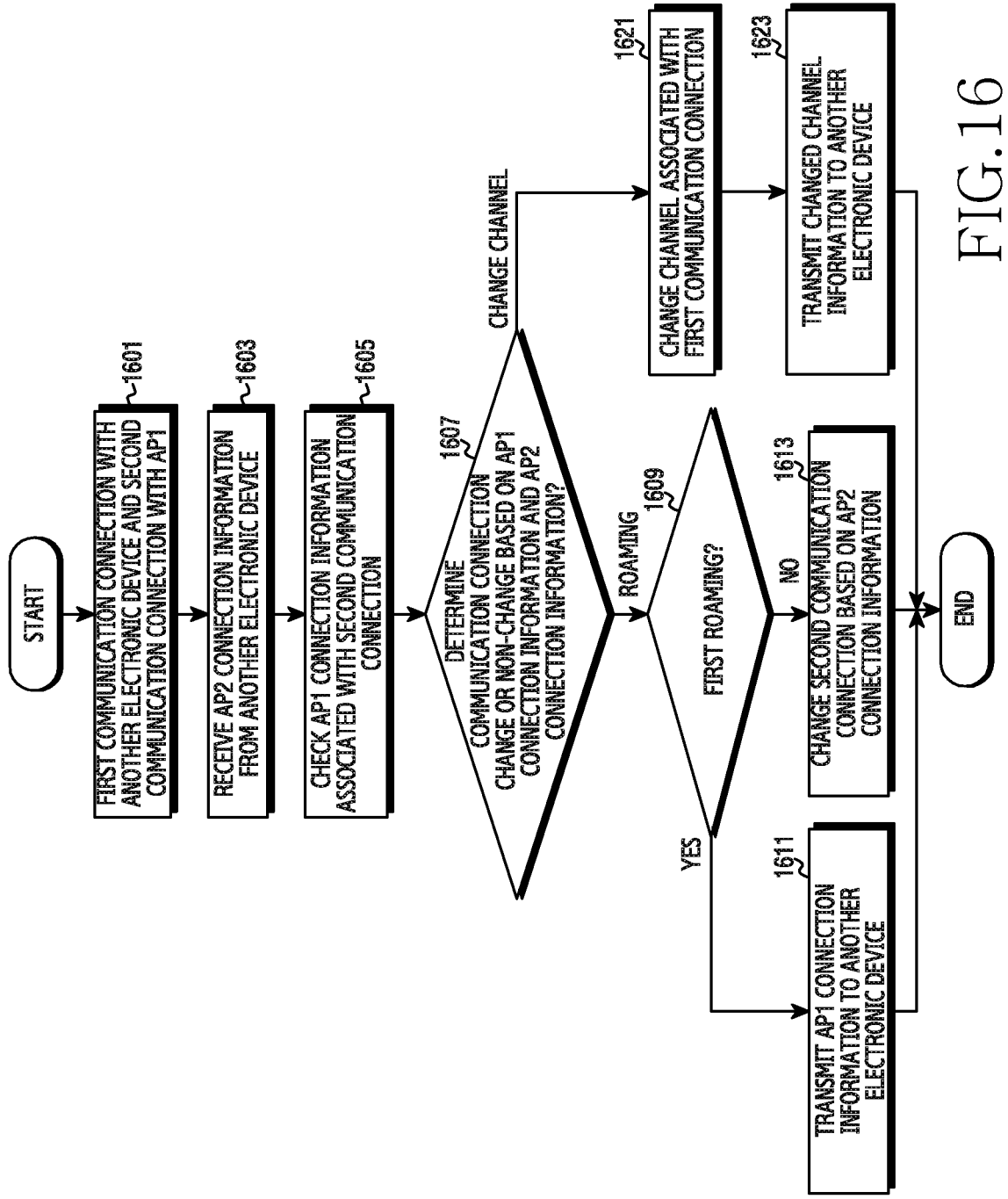
FIG. 16 is a flowchart illustrating an operation method of an electronic device according to various exemplary embodiments.

FIG. 16 is a flowchart illustrating an operation method of an electronic device according to various exemplary embodiments.

Referring to FIG. 16, in operation 1601, the electronic device 101 (e.g., the processor 120) can be first communication connected with another electronic device (e.g., the second electronic device 1520), and can be second communication connected with an access point1 (e.g., the AP1 1530). For example, the processor 120 can use a first communication channel to establish the first communication connection with the other electronic device. The processor 120) can use a second communication channel to establish the second communication connection with the access point 1. Here, the first communication channel of the first communication connection and the second communication channel of the second communication connection are 'ch 6' and can be the same as each other. Or, the first communication channel of the first communication connection is 'ch 149' and the second communication channel of the second communication connection is 'ch 6 ' and they can be different from each other as well.

In operation 1603, the electronic device 101 (e.g., the processor 120) can receive AP2 connection information from the other electronic device. The processor 120 can store the AP2 connection information in the memory 130. Or, the processor 120 can not store the AP2 connection information in the memory 130. While the other electronic device is first communication connected with the electronic device 101, the other electronic device can be third communication connected with an access point 2 (e.g., the AP2 1540). The AP2 connection information can be information on the access point 2. In case where the first communication channel of the first communication connection connected with the electronic device 101 and the third communication channel of the third communication connection connected with the access point 2 are different from each other, the other electronic device can transmit the AP2 connection information on the access point 2 to the electronic device 101. Here, if operation 1601 and operation 1603 are carried out, a communication connection state can be a '3-way-channel concurrent mode'.

In operation 1605, the electronic device 101 (e.g., the processor 120) can check AP1 connection information associated with the second communication connection. The AP1 connection information can be information on the access point 1. According to various exemplary embodiments, when establishing the second communication connection with the access point 1, the processor 120 can receive the AP1 connection information from the access point 1 and store the received AP1 connection information in the memory 130. Or, for the purpose of the AP1 connection information checking, the processor 120 can request the AP1 connection information to the access point 1 through the communication interface 170 and, in response to the request, receive the AP1 connection information from the access point 1.

In operation 1607, the electronic device 101 (e.g., the processor 120) can determine a communication connection change or non-change based on the AP1 connection information and the AP2 connection information. The communication connection change or non-change is about whether to perform a roaming for changing an access point or whether to perform a channel change for changing a communication channel. For example, the processor 120 can determine if the roaming is necessary or if the channel change is necessary for the sake of communication performance degradation or communication stability. The processor 120 can select any one of the roaming or the channel change as a method capable of maintaining the communication stability without deteriorating communication performance.

In case where the number of electronic devices connected to the access point 2 is large (e.g., the number of connected devices exceeds a reference value), or a signal strength of the access point 2 is weak (e.g., the signal strength is equal to or is less than a reference value), or the BSS load element is high (e.g., the BSS load element exceeds a reference value), the processor 120 can determine the roaming. Or, in case where the first communication channel and the second communication channel are different from each other, or in case where the first communication channel and the third communication channel are different from each other, the processor 120 can determine the channel change.

If it is the roaming, the processor 120 can perform operation 1609. If it is the channel change, the processor 120 can perform operation 1621.

If it is the roaming, in operation 1609, the electronic device 101 (e.g., the processor 120) can determine if the roaming is a first roaming or a second roaming. The first roaming can be for controlling the other electronic device to change an access point, and the second roaming can be for controlling the electronic device 101 to change an access point. The processor 120 can determine whether to perform the first roaming or whether to perform the second roaming based on the AP1 connection information and the AP2 connection information.

If it is the first roaming, in operation 1611, the electronic device 101 (e.g., the processor 120) can transmit the AP1 connection information to the other electronic device. The another electronic device can receive the AP1 connection information and, based on the AP1 connection information, release the third communication connection connected with the access point 2 and establish a new third communication connection with the access point 1. According to various exemplary embodiments, in case where the first communication channel (ch 6) and the second communication channel (ch 6) are the same as each other in operation 1601, if operation 1611 is performed, the first communication channel to the third communication channel can be all the same as one another. In this case, only one communication channel can be established in a communication connection state of a '3-way-channel concurrent mode'. Or, in case where the first communication channel (ch 149) and the second communication channel (ch 6) are different from each other in operation 1601, if operation 1611 is performed, only the first communication channel (ch 149) is different, and the second communication channel (ch 6) and the third communication channel (ch 6) can be the same as each other. In this case, two communication channels can be established in a communication connection state of a '3-way-channel concurrent mode'.

If it is the second roaming, in operation 1613, the electronic device 101 (e.g., the processor 120) can change the second communication connection based on the AP2 connection information. The processor 120) can release the second communication connection connected with the access point 1, and establish a new second communication connection with the access point 2. According to various exemplary embodiments, in case where the first communication channel (ch 6) and the second communication channel (ch 6) are the same as each other in operation 1601, if operation 1613 is performed, only the first communication channel (ch 6) is different, and the second communication channel (ch 36) and the third communication channel (ch 36) can be the same as each other. In this case, two communication channels can be established in a communication connection state of a '3-way-channel concurrent mode'. Or, in case where the first communication channel (ch 149) and the second communication channel (ch 6) are different from each other in operation 1601, if operation 1613 is performed, only the first communication channel (ch 149) is different, and the second communication channel (ch 36) and the third communication channel (ch 36) can be the same as each other. In this case, two communication channels can be established in a communication connection state of a '3-way-channel concurrent mode'.

In operation 1621, the electronic device 101 (e.g., the processor 120) can change a channel associated with the first communication connection. For example, the processor 120 can change the first communication channel of the first communication connection into the second communication channel, or change into the third communication channel. This can be for establishing at least two communication channels in a communication connection state of a '3-way-channel concurrent mode'. Based on the AP1 connection information and the AP2 connection information, the processor 120 can determine whether to change the first communication channel of the first communication connection into the second communication channel, or whether to change into the third communication channel.

In operation 1623, the electronic device 101 (e.g., the processor 120) can transmit changed channel information to the other electronic device. In case where the first communication channel is changed into the second communication channel in operation 1621, the first communication channel and the second communication channel can be the same as each other, and only the third communication channel can be different from the others. Or, in case where the first communication channel is changed into the third communication channel in operation 1621, the first communication channel and the third communication channel are the same as each other, and only the second communication channel is different from the others. In this case, two communication channels can be established in a communication connection state of a '3-way-channel concurrent mode'.

Figure 17:
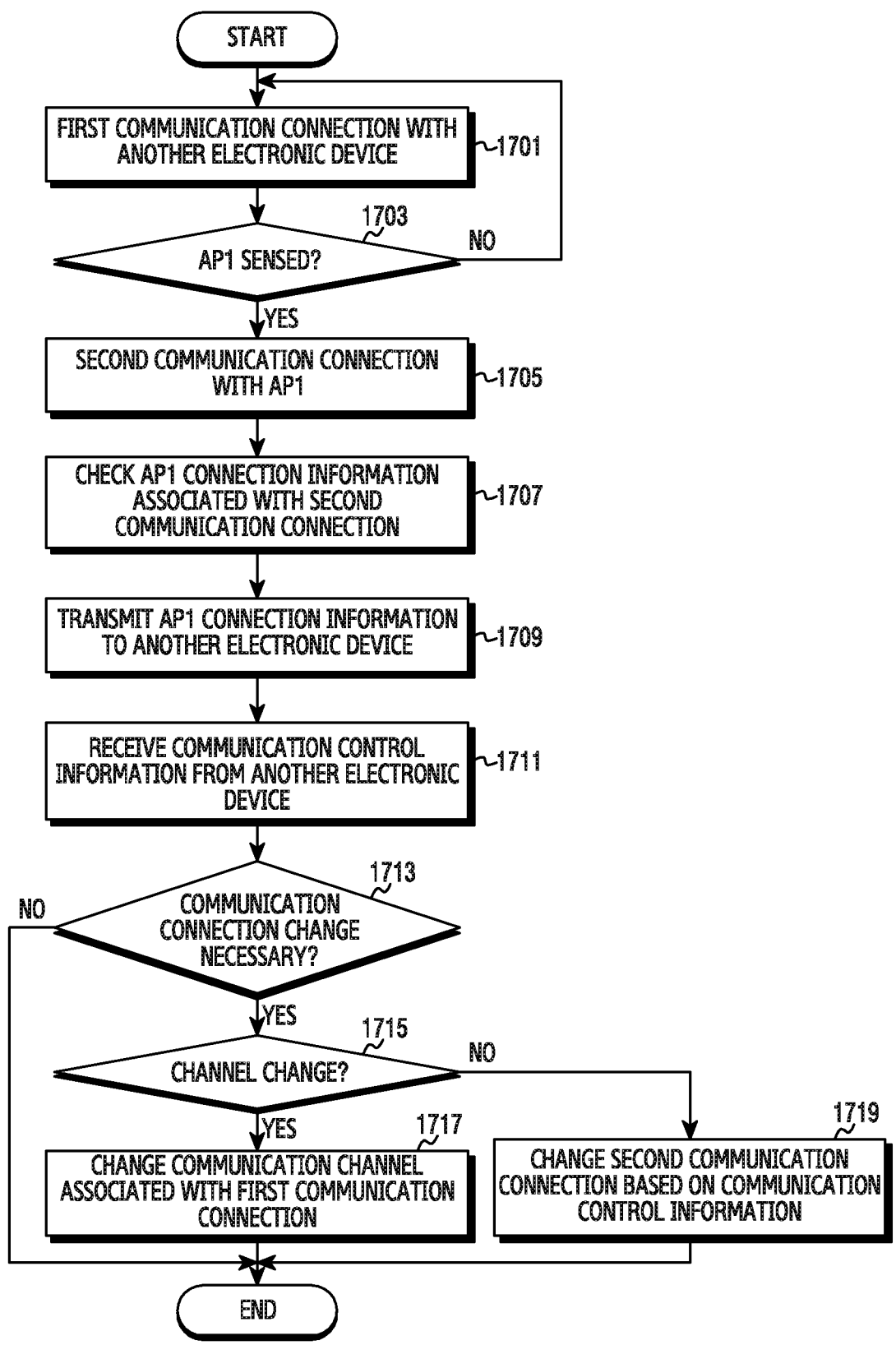
FIG. 17 is a flowchart illustrating another operation method of an electronic device according to various exemplary embodiments.

FIG. 17 is a flowchart illustrating another operation method of an electronic device according to various exemplary embodiments.

FIG. 17 illustrates an operation method carried out in another electronic device. That is, the other electronic device can be a client device of a P2P group.

In operation 1701, the electronic device 101 (e.g., the second electronic device 1520) can be first communication connected with another electronic device (e.g., the first electronic device 1510). For example, the processor 120 can use a first communication channel (e.g., ch 149) to establish a first communication connection with the other electronic device.

In operation 1703, the electronic device 101 (e.g., the processor 120) can sense an access point 1 (e.g., the AP1 1530). The processor 120 can scan whether an access point exists around based on setting of a user or setting of the electronic device 101. For example, the communication interface 170 can transmit a request signal (e.g., a probe request message) to an access point existing within a communication connectable area, and receive a response signal (e.g., a probe response message) from the access point responding to the request signal.

For example, if receiving the response signal through the communication interface 170, the processor 120 can perform operation 1705. If failing to receive the response signal, the processor 120 can return to operation 1701.

In operation 1707, the electronic device 101 (e.g., the processor 120) can check AP1 connection information associated with the second communication connection. When establishing the second communication connection with the access point 1, the processor 120 can receive the AP1 connection information from the access point 1 and store the received AP1 connection information in the memory 130. Or, for the purpose of the AP1 connection information checking, the processor 120 can request the AP1 connection information to the access point 1 and, in response to the request, receive the AP1 connection information from the access point 1.

In operation 1709, the electronic device 101 (e.g., the processor 120) can transmit the AP1 connection information to the other electronic device through the communication interface 170. In case where a first communication channel of the first communication connection connected with the other electronic device and a second communication channel of the second communication connection connected with the access point 1 are different from each other, the processor 120 can transmit the AP1 connection information associated with the access point 1 to the other electronic device.

In operation 1711, the electronic device 101 (e.g., the processor 120) can receive communication control information from the other electronic device. The communication control information can include changed channel information on a channel change, or AP2 connection information on a roaming.

In operation 1713, the electronic device 101 (e.g., the processor 120) can determine if a change of a communication connection is necessary based on the communication control information.

If the communication connection change is necessary, the electronic device 101 (e.g., the processor 120) can perform operation 1715. If the communication connection change is not necessary, the processor 120 can go to the end. According to various exemplary embodiments, in case where the communication connection change is not necessary, the processor 120 can receive no information from the other electronic device. Or, in case where the communication connection change is not necessary, the processor 120 can receive communication control information including channel information of the first communication connection from the other electronic device.

In operation 1715, the electronic device 101 (e.g., the processor 120) can determine if the communication connection change is a channel change. If it is the channel change, the processor 120 can perform operation 1717. If it is not the channel change, the processor 120 can perform operation 1719.

If it is the channel change, in operation 1717, the electronic device 101 (e.g., the processor 120) can change the communication channel associated with the first communication connection. For example, based on the communication control information, the processor 120) can change the first communication channel of the first communication connection into a communication channel that the other electronic device designates. The communication channel that the other electronic device designates can be a communication channel of the access point 2 (e.g., the AP2 1540) connected with the other electronic device. Or, based on the communication control information, the processor 120 can change the first communication channel of the first communication connection into the second communication channel of the second communication connection.

If it is not the channel change, in operation 1719, the electronic device 101 (e.g., the processor 120) can change the second communication connection based on the communication control information. For example, the processor 120 can release the second communication connection connected with the access point 1 and, based on the communication control information, establish a second communication connection with the access point 2. The access point 2 can be an access point connected with the other electronic device.

A method for operating in an electronic device including a communication module and a processor according to various exemplary embodiments is provided. The operation method can include using a first communication channel to establish a first communication connection between the electronic device and another electronic device through the communication module, while the first communication connection has been established, checking a second communication connection between the electronic device and a first access point using the second communication channel, and based on the checking, changing a channel for the first communication connection from the first communication channel to the second communication channel through the processor.

The changing can include transmitting a signal including the second communication channel, to the other electronic device which the first communication connection is established with.

The operation method can further include receiving information on a third communication connection between the other electronic device and a second access point, from the other electronic device, and based on the second communication connection and the third communication connection, determining a channel change or non-change of the second communication connection.

The determining can include maintaining a channel of the second communication connection in case where the number of electronic devices connected to the first access point is equal to or is less than a reference value or a Basic Service Set (BSS) load element of the first access point is equal to or is less than a reference value, and changing a channel of the first communication connection identically with a channel of the third communication connection in case where the number of electronic device connected to the second access point is equal to or is less than a reference value, or a BSS load element of the second access point is equal to or is less than a reference value.

The operation method can further include receiving information on a third communication connection between the other electronic device and a second access point, from the other electronic device, and based on the second communication connection and the third communication connection, determining a change or non-change of the second communication connection or the third communication connection.

The determining can include changing the second communication connection connected with the first access point into the second access point in case where it is at least one among that the number of electronic devices connected to the first access point is equal to or is less than a reference value, that a signal strength of the first access point is equal to or is less than a reference value, and/or that a BSS load element of the first access point is equal to or is less than a reference value, and changing a third communication connection connected with the second access point into the first access point in case where it is at least one among that the number of electronic devices connected to the second access point is equal to or is less than a reference value, that a signal strength of the second access point is equal to or is less than a reference value, and/or that a BSS load element of the second access point is equal to or is less than a reference value.

Changing the third communication connection into the first access point can include transmitting to the other electronic device a roaming signal instructing to change the third communication connection connected with the second access point into a connection with the first access point.

The communication module can communicate with the other electronic device through the first communication connection by a first protocol, and communicate with the first access point through the second communication connection by a second protocol.

The first protocol can include Wireless Fidelity (Wi-Fi) direct, and the second protocol can include Wi-Fi.

A method for operating in an electronic device including a communication module and a processor according to various exemplary embodiments is provided. The operation method can include using a first communication channel to establish a first communication connection between the electronic device and another electronic device through the communication module, while the first communication connection has been established, checking a second communication connection between the electronic device and a first access point using the second communication channel, and based on the checking, transmitting information on the second communication connection to the other electronic device, and through the processor, receiving a signal for changing the first communication channel into the second communication channel from the other electronic device, and changing the first communication channel into the second communication channel.

The operation method can further include, while the first communication connection and the second communication connection have been established, receiving a signal for changing the second communication channel into a channel related with a third communication connection between the other electronic device and a second access point, from the other electronic device, and based on the signal, changing the second communication channel into the channel related with the third communication connection.

The operation method can further include, while the first communication connection and the second communication connection have been established, receiving information on a third communication connection between the other electronic device and a second access point from the other electronic device, and based on the information on the third communication connection, changing the second communication connection connected with the first access point into the second access point.

A computer-readable recording media can include a hard disk, a floppy disk, a magnetic media (e.g., a magnetic tape), an optical media (e.g., a Compact Disc-Read Only Memory (CD-ROM) and/or Digital Versatile Disk (DVD)), a Magneto-Optical Media (e.g., a floptical disk), an internal memory, etc. An instruction can include a code made by a compiler or a code executable by an interpreter. A module or a program module according to various exemplary embodiments can further include at least one or more of the aforementioned constituent elements, or omit some, or further include another constituent element. Operations carried out by a module, a program module or another constituent element according to various exemplary embodiments can be executed in a sequential, parallel, repeated or heuristic method, or at least some operations can be executed in different order or can be omitted, or another operation can be added.

A computer-readable recording medium according to various exemplary embodiments can record a program for executing the operations of using a first communication channel to establish a first communication connection between an electronic device and another electronic device, while the first communication connection has been established, check a second communication connection between the electronic device and an access point using a second communication channel, and based on the checking, changing a channel for the first communication connection from the first communication channel to the second communication channel.

A computer-readable recording medium according to various exemplary embodiments can record a program for executing the operations of using a first communication channel to establish a first communication connection between an electronic device and another electronic device, while the first communication connection has been established, checking a second communication connection between the electronic device and a first access point using the second communication channel, and based on the checking, transmitting information on the second communication connection to the other electronic device, and receiving a signal for changing the first communication channel into the second communication channel from the other electronic device by using the processor and changing the first communication channel into the second communication channel.

Exemplary embodiments disclosed in the present specification and drawings only suggest specific examples so as to easily explain the technological content of the present disclosure and help the understanding thereof, and do not intend to limit the spirit and scope of the present disclosure. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a communication module configured to support a plurality of communication channels that comprise a first communication channel and a second communication channel, the first communication channel operating at a first center frequency, the second communication channel operating at a second center frequency distinct from the first center frequency; and
   a processor operatively coupled with the communication module, the processor configured to:
   establish, using the first communication channel, a first communication connection between the electronic device and another electronic device,
   while the first communication connection has been established, identify a second communication connection between the electronic device and a first access point, the second communication connection being established using the second communication channel, and
   change, based on the identification, the first communication channel to a third communication channel operating at the second center frequency which the second communication channel operates, the third communication channel being a communication channel for the first communication connection between the electronic device and another electronic device.

2. The electronic device of claim 1, wherein the processor is further configured to transmit a signal including information on the third communication channel, to the other electronic device which the first communication connection is established with, through the communication module.

3. The electronic device of claim 1, wherein the processor is configured to:
receive information on a third communication connection between the other electronic device and a second access point, from the other electronic device, and
based on the second communication connection and the third communication connection, determine a channel change or non-change of the second communication connection.

4. The electronic device of claim 3, wherein the processor is further configured to:
maintain a channel of the second communication connection when a number of electronic devices connected to the first access point is equal to or is less than a reference number or a Basic Service Set (BSS) load element of the first access point is equal to or is less than a reference BSS load element, and
change the first communication channel to a fourth communication channel which operates at a center frequency identical to a center frequency at which a communication channel for the third communication connection operates when the number of electronic device connected to the second access point is equal to or is less than a reference number, or a BSS load element of the second access point is equal to or is less than a reference load element.

5. The electronic device of claim 1, wherein the processor is further configured to:
receive information on a third communication connection between the other electronic device and a second access point from the other electronic device, and
determine a change or non-change of the second communication connection or the third communication connection, based on the second communication connection and the third communication connection.

6. The electronic device of claim 5, wherein the processor is configured to:
connect the electronic device from the first access point into the second access point at least one of:
when a number of electronic devices connected to the first access point is equal to or is less than a reference number;
when a signal strength of the first access point is equal to or is less than a reference signal strength; or
when a BSS load element of the first access point is equal to or is less than a reference BSS load element, and
connect the other electronic device from the second access point into the first access point at least one of:
when a number of electronic devices connected to the second access point is equal to or is less than a reference number;
when a signal strength of the second access point is equal to or is less than a reference signal strength; or
when a BSS load element of the second access point is equal to or is less than a reference BSS load element.

7. The electronic device of claim 6, wherein the processor is further configured to:
release the second communication connection connected with the first access point when changing the second communication connection; and
establish a new second communication connection with the second access point based on the third communication connection.

8. The electronic device of claim 6, wherein the processor is further configured to, when changing the third communication connection, transmit to the other electronic device a roaming signal instructing to connect the other electronic device from the second access point into the first access point.

9. The electronic device of claim 1, wherein the communication module further is configured to:
communicate with the other electronic device through the first communication connection using a first protocol; and
communicate with the first access point through the second communication connection using a second protocol.

10. The electronic device of claim 9, wherein the first protocol comprises Wireless Fidelity (Wi-Fi) direct and the second protocol comprises Wi-Fi.

11. An electronic device comprising:
a communication module supporting a plurality of communication channels that comprise a first communication channel and a second communication channel, the first communication channel operating at a first center frequency, the second communication channel operating at a second center frequency distinct from the first center frequency; and
a processor operatively coupled with the communication module,
wherein the processor is configured to:
establish, using the first communication channel, a first communication connection between the electronic device and another electronic device,
while the first communication connection has been established, identify a second communication connection between the electronic device and a first access point, the second communication connection being established using the second communication channel,
based on the identification, transmit information on the second communication connection to the other electronic device, and
receive, from the other electronic device, a signal for changing the first communication channel into a third communication channel operating at the second center frequency which the second communication channel operates, the third communication channel being a communication channel for the first communication connection between the electronic device and another electronic device, and
change the first communication channel into the third communication channel.

12. The electronic device of claim 11, wherein the processor is further configured to:
while the first communication connection and the second communication connection have been established, receive a signal for changing the second communication channel into a fourth communication channel related with a third communication connection between the other electronic device and a second access point, from the other electronic device; and
change the second communication channel into a fifth communication channel which operates at a center frequency identical to a center frequency at which the fourth communication channel operates, based on the signal.

13. The electronic device of claim 11, wherein the processor is further configured to:
  while the first communication connection and the second communication connection have been established, receive information on a third communication connection between the other electronic device and a second access point from the other electronic device; and
  connect the electronic device from the first access point into the second access point, based on the information on the third communication connection.

14. A method for operating in an electronic device comprising a communication module and a processor, the method comprising:
  establish, using a first communication channel, a first communication connection between the electronic device and another electronic device through the communication module, the first communication channel operating at a first center frequency;
  while the first communication connection has been established, identifying a second communication connection between the electronic device and a first access point, the second communication connection being established using a second communication channel, the second communication channel operating at a second center frequency distinct from the first center frequency, and
  change, based on the identifying, the first communication connection from the first communication channel a third communication channel operating at the second center frequency which the second communication channel operates, the third communication channel being a communication channel for the first communication connection between the electronic device and another electronic device.

15. The method of claim 14, wherein the changing comprises transmitting a signal including information on the third communication channel, to the other electronic device which the first communication connection is established with.

16. The method of claim 14, further comprising:
  receiving, from the other electronic device, information on a third communication connection between the other electronic device and a second access point; and
  determining a channel change or non-change of the second communication connection, based on the second communication connection and the third communication connection.

17. The method of claim 16, wherein the determining comprises:
  maintaining a channel of the second communication connection in case where a number of electronic devices connected to the first access point is equal to or is less than a reference number or a Basic Service Set (BSS) load element of the first access point is equal to or is less than a reference BSS load element; and
  changing the first communication channel to a fourth communication channel which operates at a center frequency identical to a center frequency at which a communication channel for the third communication connection operates when a number of electronic device connected to the second access point is equal to or is less than a reference number, or a BSS load element of the second access point is equal to or is less than a reference BSS load element.

18. The method of claim 14, further comprising:
  receiving, from the other electronic device, information on a third communication connection between the other electronic device and a second access point; and
  based on the second communication connection and the third communication connection, determining a change or non-change of the second communication connection or the third communication connection.

19. The method of claim 18, wherein the determining comprises:
  connecting the electronic device from the first access point into the second access point at least one of:
  when a number of electronic devices connected to the first access point is equal to or is less than a reference number;
  when a signal strength of the first access point is equal to or is less than a reference signal strength; or
  when a BSS load element of the first access point is equal to or is less than a reference BSS load element, and
  connect the other electronic device from the second access point into the first access point at least one of:
  when a number of electronic devices connected to the second access point is equal to or is less than a reference number;
  when a signal strength of the second access point is equal to or is less than a signal strength; or
  when a BSS load element of the second access point is equal to or is less than a reference BSS load element.

20. The method of claim 19, wherein changing the third communication connection into the first access point comprises transmitting to the other electronic device a roaming signal instructing to connect the other electronic device from the second access point into the first access point.

* * * * *

UNITED STATES PATENT AND TRADEMARK OFFICE
CERTIFICATE OF CORRECTION

| | |
|---|---|
| PATENT NO. | : 10,548,178 B2 |
| APPLICATION NO. | : 15/399615 |
| DATED | : January 28, 2020 |
| INVENTOR(S) | : Bu-Seop Jung et al. |

It is certified that error appears in the above-identified patent and that said Letters Patent is hereby corrected as shown below:

In the Claims

In Column 43, Claim 1:
Line 2, "and another" should read --and 2) the other--;

In Column 44, Claim 11:
Line 50, "and another" should read --and 2) the other--;

In Column 45, Claim 14:
Line 28-29, "channel a third" should read --channel 1) to a third--;
Line 33-34, "and another" should read --and 2) the other--.

Signed and Sealed this
Twentieth Day of June, 2023

Katherine Kelly Vidal
*Director of the United States Patent and Trademark Office*